United States Patent
Herron et al.

(10) Patent No.: US 11,173,476 B2
(45) Date of Patent: Nov. 16, 2021

(54) METATHESIS CATALYSTS

(71) Applicant: Umicore AG & Co. KG, Hanau-Wolfgang (DE)

(72) Inventors: Jessica R. Herron, Pasadena, CA (US); Richard L. Pederson, San Gabriel, CA (US); Adam M. Johns, Claremont, CA (US); Michael A. Giardello, Pasadena, CA (US)

(73) Assignee: Umicore AG & Co. KG

( * ) Notice: Subject to any disclaimer, the term of this patent is extended or adjusted under 35 U.S.C. 154(b) by 455 days.

(21) Appl. No.: 16/325,049

(22) PCT Filed: Aug. 10, 2017

(86) PCT No.: PCT/US2017/046262
§ 371 (c)(1),
(2) Date: Feb. 12, 2019

(87) PCT Pub. No.: WO2018/034931
PCT Pub. Date: Feb. 22, 2018

(65) Prior Publication Data
US 2021/0291155 A1  Sep. 23, 2021

Related U.S. Application Data

(60) Provisional application No. 62/375,371, filed on Aug. 15, 2016.

(51) Int. Cl.
*B01J 31/22* (2006.01)
*B01J 31/18* (2006.01)
*C07F 15/00* (2006.01)

(52) U.S. Cl.
CPC ....... *B01J 31/2278* (2013.01); *B01J 31/1805* (2013.01); *B01J 31/1865* (2013.01); *B01J 31/1875* (2013.01); *B01J 31/226* (2013.01); *B01J 31/2208* (2013.01); *B01J 31/2226* (2013.01); *C07F 15/0046* (2013.01); *B01J 2231/543* (2013.01); *B01J 2531/821* (2013.01)

(58) Field of Classification Search
None
See application file for complete search history.

(56) References Cited

U.S. PATENT DOCUMENTS

| | | |
|---|---|---|
| 7,294,717 B2 | 11/2007 | Herrmann et al. |
| 2005/0014916 A1 | 1/2005 | Sakamoto et al. |
| 2013/0165649 A1 | 6/2013 | Cazin |
| 2014/0309433 A1 | 10/2014 | Marx et al. |
| 2014/0329017 A1 | 11/2014 | Wang et al. |
| 2016/0185684 A1 | 6/2016 | Hartung, Jr. et al. |

OTHER PUBLICATIONS

Sanford, M., et al., "A Versatile Precursor for the Synthesis of New Ruthenium Olefin Metathesis", Organometallics, 2001, vol. 20, No. 25, pp. 5314-5318.
Adlhart, C., et al., "Mechanism and Activity of Ruthenium Olefin Metathesis Catalysts: The Role of Ligands and Substrates from a theoretical Perspective", *J. Am. Chem. Soc.*, 2004, vol. 126, pp. 3496-3510.
International Serach Report for PCT/US2017/046262 dated Dec. 8, 2017.
Written Opinion of the International Searching Authority for PCT/US2017/046262 dated Dec. 8, 2017.

*Primary Examiner* — Joseph R Kosack
(74) *Attorney, Agent, or Firm* — Faegre Drinker Biddle & Reath LLP

(57) ABSTRACT

This invention relates generally to olefin metathesis catalysts, to the preparation of such compounds, compositions comprising such compounds, methods of using such compounds, and the use of such compounds in the metathesis of olefins and in the synthesis of related olefin metathesis catalysts. The invention has utility in the fields of catalysis, organic synthesis, polymer chemistry, and in industrial applications such as oil and gas, fine chemicals and pharmaceuticals.

17 Claims, No Drawings

METATHESIS CATALYSTS

CROSS-REFERENCE TO RELATED APPLICATIONS

This application is a national stage application (under 35 U.S.C. § 371) of PCT/US2017/046262, filed Aug. 10, 2017, which claims benefit of U.S. Application No. 62/375,371, filed Aug. 15, 2016, both of which are incorporated herein by reference in their entirety.

TECHNICAL FIELD

This invention relates generally to olefin metathesis catalysts, to the preparation of such compounds, compositions comprising such compounds, methods of using such compounds, and the use of such compounds in the metathesis of olefins and in the synthesis of related olefin metathesis catalysts. The invention has utility in the fields of catalysis, organic synthesis, polymer chemistry, and in industrial applications such as oil and gas, fine chemicals and pharmaceuticals.

BACKGROUND

Since its discovery in the 1950s, olefin metathesis has emerged as a valuable synthetic method for the formation of carbon-carbon double bonds. Recent advances in applications to organic syntheses and polymer syntheses mostly rely on developments of well-defined olefin metathesis catalysts.

The technology of ruthenium metathesis catalysts has enabled the development of several research platforms including: ring opening metathesis polymerization (ROMP), ring opening cross metathesis (ROCM), cross metathesis (CM), ring closing metathesis (RCM).

First Generation Grubbs ruthenium olefin metathesis catalysts, such as: $(PCy_3)_2(Cl)_2Ru=CHPh$, have been largely used in organic synthesis.

The incorporation of certain types of N-Heterocyclic Carbene (NHC) ligands played an essential role in the development of ruthenium metathesis catalysts, giving rise to the Second Generation Grubbs ruthenium olefin metathesis catalysts, such as: $(IMesH_2)(PCy_3)(Cl)_2Ru=CHPh$, where $IMesH_2$ is 1,3-dimesityl-4,5-dihydroimidazol-2-ylidene.

In order to exchange the phosphine on the Second Generation Grubbs ruthenium olefin metathesis catalysts, the Grubbs group reported in 2001 (*Organometallics* 2001, 20, 5314-5318) a method involving a precursor bearing two pyridine ligands: $(IMesH_2)(Cl)_2(C_5H_5N)_2Ru=CHPh$. The labile pyridine ligands allow the facile preparation of diverse ruthenium olefin metathesis catalysts. However, the preparation of pyridine complexes, requires large quantities of expensive and malodorous reagents (pyridines), and difficult reaction conditions (negative ° C. temperatures) especially for industrial scale-up.

Therefore there is an ongoing need for efficient, high yield, high purity and ease in scaling up procedures for the synthesis of olefin metathesis catalysts, particularly Second Generation Grubbs ruthenium olefin metathesis catalysts.

SUMMARY OF THE INVENTION

To meet this need the inventors have discovered novel ruthenium olefin metathesis catalysts, bearing a nitrile ligand as described herein. The ruthenium olefin metathesis catalysts bearing nitrile labile ligands have allowed the synthesis of various Second Generation Grubbs ruthenium olefin metathesis catalysts in higher yield and with higher purity, compared to the existing procedures.

In one embodiment, the invention provides an olefin metathesis catalyst, represented by the structure of Formula (I):

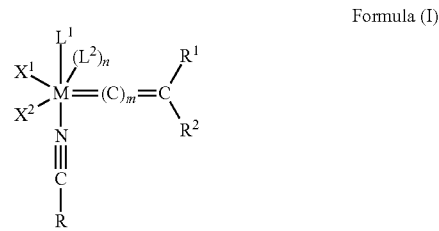

Formula (I)

wherein:

M is a Group 8 transition metal; generally M is ruthenium or osmium; typically M is ruthenium;

$L^1$ and $L^2$ are independently neutral electron donor ligands;

n is 0 or 1; typically n is 0;

m is 0, 1 or 2; typically m is 0;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently anionic ligands; generally $X^1$ and $X^2$ are independently halogen, trifluoroacetate, perfluorophenolate, thiolate, alkylthio, arylthio or nitrate; typically $X^1$ and $X^2$ are independently Cl, Br, I or F; and $R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically $R^1$ is hydrogen and typically $R^2$ is phenyl, substituted phenyl or substituted 1-propenyl; or $R^1$ and $R^2$ are linked together to form an optionally substituted indenylidene.

Any two or more (typically two, three, or four) of $X^1$, $X^2$, $L^1$, $L^2$, $R^1$, and $R^2$ are optionally linked together to form a cyclic group, including bidentate or multidentate ligands; or any one or more of $X^1$, $X^2$, $L^1$, $L^2$, $R^1$, and $R^2$ is/are optionally attached to a support.

In one embodiment, the invention provides a method of synthesizing the olefin metathesis catalysts of the invention.

In one embodiment, the invention provides a method of using the olefin metathesis catalysts of the invention in metathesis reactions.

In one embodiment, the invention provides a method of synthesizing a Second generation Grubbs catalyst, using an olefin metathesis catalyst of the invention.

Other embodiments of the invention are described herein.

These and other aspects of the present invention will be apparent to one of skill in the art, in light of the following detailed description and examples. Furthermore, it is to be understood that none of the embodiments or examples of the invention described herein are to be interpreted as being limiting.

DETAILED DESCRIPTION

Unless otherwise indicated, the invention is not limited to specific reactants, substituents, catalysts, reaction conditions, or the like, as such may vary. It is also to be understood that the terminology used herein is for the purpose of describing particular embodiments only and is not to be interpreted as being limiting.

As used in the specification and the appended claims, the singular forms "a," an, and "the" include plural referents unless the context clearly dictates otherwise. Thus, for example, reference to "an olefin" includes a single olefin as well as a combination or mixture of two or more olefins, reference to "a substituent" encompasses a single substituent as well as two or more substituents, and the like.

As used in the specification and the appended claims, the terms "for example," "for instance," "such as," or "including" are meant to introduce examples that further clarify more general subject matter. Unless otherwise specified, these examples are provided only as an aid for understanding the invention, and are not meant to be limiting in any fashion.

In this specification and in the claims that follow, reference will be made to a number of terms, which shall be defined to have the following meanings:

The term "alkyl" as used herein, refers to a linear, branched, or cyclic saturated hydrocarbon group typically although not necessarily containing 1 to 30 carbon atoms, generally containing 1 to 24 carbon atoms, typically 1 to 12 carbon atoms, such as methyl, ethyl, n-propyl, iso-propyl, n-butyl, iso-butyl, t-butyl, octyl, decyl, and the like, as well as cycloalkyl groups such as cyclopentyl, cyclohexyl and the like. The term "lower alkyl" intends an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl substituted with one or more substituent groups, and the terms "heteroatom-containing alkyl" and "heteroalkyl" refer to alkyl in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl, respectively.

The term "alkylene" as used herein, refers to a divalent linear, branched, or cyclic alkyl group, where "alkyl" is as defined herein.

The term "alkenyl" as used herein, refers to a linear, branched, or cyclic hydrocarbon group of 2 to 30 carbon atoms containing at least one double bond, such as ethenyl, n-propenyl, iso-propenyl, n-butenyl, iso-butenyl, octenyl, decenyl, tetradecenyl, hexadecenyl, eicosenyl, tetracosenyl, and the like. Generally "alkenyl" groups herein contain 2 to 24 carbon atoms, typically "alkenyl" groups herein contain 2 to 12 carbon atoms. The term "lower alkenyl" intends an "alkenyl" group of 2 to 6 carbon atoms, and the specific term "cycloalkenyl" intends a cyclic "alkenyl" group, typically having 5 to 8 carbon atoms. The term "substituted alkenyl" refers to "alkenyl" substituted with one or more substituent groups, and the terms "heteroatom-containing alkenyl" and "heteroalkenyl" refer to "alkenyl" in which at least one carbon atom is replaced with a heteroatom. If not otherwise indicated, the terms "alkenyl" and "lower alkenyl" include linear, branched, cyclic, unsubstituted, substituted, and/or heteroatom-containing "alkenyl" and lower "alkenyl," respectively. The term "alkenyl" is used interchangeably with the term "olefin" herein.

The term "alkenylene" as used herein, refers to a divalent linear, branched, or cyclic alkenyl group, where "alkenyl" is as defined herein.

The term "alkynyl" as used herein, refers to a linear or branched hydrocarbon group of 2 to 30 carbon atoms containing at least one triple bond, such as ethynyl, n-propynyl, and the like. Generally "alkynyl" groups herein contain 2 to 24 carbon atoms; typical "alkynyl" groups described herein contain 2 to 12 carbon atoms. The term "lower alkynyl" intends an "alkynyl" group of 2 to 6 carbon atoms. The term "substituted alkynyl" refers to "alkynyl" substituted with one or more substituent groups, and the terms "heteroatom-containing alkynyl" and "heteroalkynyl" refer to "alkynyl" in which at least one carbon atom is replaced with a heteroatom. If not otherwise indicated, the terms "alkynyl" and "lower alkynyl" include linear, branched, unsubstituted, substituted, and/or heteroatom-containing "alkynyl" and lower "alkynyl," respectively.

The term "alkoxy" as used herein refers to an alkyl group bound through a single, terminal ether linkage; that is, an "alkoxy" group can be represented as —O-alkyl where alkyl is as defined above. A "lower alkoxy" group refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). "Aryl" groups contain 5 to 30 carbon atoms, generally "aryl" groups contain 5 to 20 carbon atoms; and typically "aryl" groups contain 5 to 14 carbon atoms. Exemplary "aryl" groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups. The terms "heteroatom-containing aryl" and "heteroaryl" refer to "aryl" substituents in which at least one carbon atom is replaced with a heteroatom, as will be described in further detail infra.

The term "aryloxy" as used herein refers to an aryl group bound through a single, terminal ether linkage, wherein "aryl" is as defined above. An "aryloxy" group can be represented as —O-aryl where aryl is as defined above. Preferred "aryloxy" groups contain 5 to 24 carbon atoms, and particularly preferred "aryloxy" groups contain 5 to 14 carbon atoms. Examples of "aryloxy" groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. "Alkaryl" and "aralkyl" groups contain 6 to 30 carbon atoms; generally "alkaryl" and "aralkyl" groups contain 6 to 20 carbon atoms; and typically "alkaryl" and "aralkyl" groups contain 6 to 16 carbon atoms. "Alkaryl" groups include, for example, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of "aralkyl" groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is "alkaryl" or "aralkyl," respectively, as defined herein.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl," and "aralkyl" are as defined herein.

The terms "cyclic" and "ring" refer to alicyclic or aromatic groups that may or may not be substituted and/or heteroatom containing, and that can be monocyclic, bicyclic, or polycyclic. The term "alicyclic" is used in the conventional sense to refer to an aliphatic cyclic moiety, as opposed to an aromatic cyclic moiety, and can be monocyclic, bicyclic, or polycyclic.

The terms "halo," "halogen," and "halide" are used in the conventional sense to refer to a chloro, bromo, fluoro, or iodo substituent.

The term "hydrocarbyl" refers to univalent "hydrocarbyl" moieties containing 1 to 30 carbon atoms, typically containing 1 to 24 carbon atoms, specifically containing 1 to 12 carbon atoms, including linear, branched, cyclic, saturated, and unsaturated species, such as alkyl groups, alkenyl groups, aryl groups, and the like. The term "lower hydrocarbyl" intends a "hydrocarbyl" group of 1 to 6 carbon atoms, typically 1 to 4 carbon atoms, and the term "hydrocarbylene" intends a divalent "hydrocarbyl" moiety containing 1 to 30 carbon atoms, typically 1 to 24 carbon atoms, specifically 1 to 12 carbon atoms, including linear, branched, cyclic, saturated and unsaturated species. The term "lower hydrocarbylene" intends a "hydrocarbylene" group of 1 to 6 carbon atoms. "Substituted hydrocarbyl" refers to "hydrocarbyl" substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to "hydrocarbylene" substituted with one or more substituent groups, and the terms "heteroatom-containing hydrocarbylene" and "heterohydrocarbylene" refer to "hydrocarbylene" in which at least one carbon atom is replaced with a heteroatom. Unless otherwise indicated, the term "hydrocarbyl" and "hydrocarbylene" are to be interpreted as including substituted and/or heteroatom-containing "hydrocarbyl" and "hydrocarbylene" moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" can be monocyclic, bicyclic, or polycyclic as described herein with respect to the term "aryl." Examples of heteroalkyl groups include alkoxyaryl, alkylsulfanyl-substituted alkyl, N-alkylated amino alkyl, and the like. Examples of heteroaryl substituents include pyrrolyl, pyrrolidinyl, pyridinyl, quinolinyl, indolyl, pyrimidinyl, imidazolyl, 1,2,4-triazolyl, tetrazolyl, etc.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation: functional groups referred to herein as "Fn," such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO)—X where X is halo, $C_2$-$C_{24}$ alkylcarbonato (—O—(CO)—O-alkyl), $C_6$-$C_{24}$ arylcarbonato (—O—(CO)—O-aryl), carboxyl (—COOH), carboxylato (—COO$^-$), carbamoyl (—(CO)—NH$_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$, mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), N—($C_1$-$C_{24}$ alkyl)-N—($C_5$-$C_{24}$ aryl)-substituted carbamoyl, thiocarbamoyl (—(CS)—NH$_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), N—($C_1$-$C_{24}$ alkyl)-N—($C_5$-$C_{24}$ aryl)-substituted thiocarbamoyl, carbamido (—NH—(CO)—NH$_2$), cyano(—C≡N), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino, di-($C_1$-$C_{24}$ alkyl)-substituted amino, mono-($C_5$-$C_{24}$ aryl)-substituted amino, di-($C_5$-$C_{24}$ aryl)-substituted amino, ($C_1$-$C_{24}$ alkyl)($C_5$-$C_{24}$ aryl)-substituted amino, $C_2$-$C_{24}$ alkylamido (—NH—(CO)-alkyl), $C_6$-$C_{24}$ arylamido (—NH—(CO)-aryl), imino (—CR=NH where R is hydrogen, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CR=N(alkyl), where R is hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R is hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$—OH), sulfonato (—SO$_2$—O$^-$), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl —SO$_2$—N(H) alkyl), $C_1$-$C_{24}$ dialkylaminosulfonyl —SO$_2$—N(alkyl)$_2$, $C_5$-$C_{24}$ arylsulfonyl (—SO$_2$-aryl), boryl (—BH$_2$), borono (—B(OH)$_2$), boronato (—B(OR)$_2$ where R is alkyl or other hydrocarbyl), phosphono (—P(O)(OH)$_2$), phosphonato (—P(O)(O$^-$)$_2$), phosphinato (—P(O)(O$^-$)), phospho (—PO$_2$), and phosphino (–PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{14}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl).

By "Grubbs-Hoveyda ligands," it is meant benzylidene ligands having a chelating alkyloxy group attached to the benzene ring at the ortho position.

By "functionalized" as in "functionalized hydrocarbyl," "functionalized alkyl," "functionalized olefin," "functionalized cyclic olefin," and the like, it is meant that in the hydrocarbyl, alkyl, olefin, cyclic olefin, or other moiety, at least one hydrogen atom bound to a carbon (or other) atom is replaced with one or more functional groups such as those described hereinabove. The term "functional group" is meant to include any functional species that is suitable for the uses described herein. In particular, as used herein, a functional group would necessarily possess the ability to react with or bond to corresponding functional groups on a substrate surface.

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties can be further substituted with one or more functional groups or additional hydrocarbyl moieties such as those specifically enumerated.

"Optional" or "optionally" means that the subsequently described circumstance can or cannot occur, so that the description includes instances where the circumstance occurs and instances where it does not. For example, the phrase "optionally substituted" means that a non-hydrogen substituent can or cannot be present on a given atom, and, thus, the description includes structures wherein a non-hydrogen substituent is present and structures wherein a non-hydrogen substituent is not present.

Olefin Metathesis Catalysts

In one embodiment, the invention provides an olefin metathesis catalyst, represented by the structure of Formula (I):

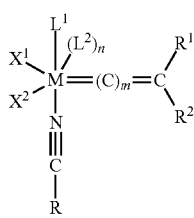

Formula (I)

wherein:

M is a Group 8 transition metal; generally M is ruthenium or osmium; typically M is ruthenium;

$L^1$ and $L^2$ are independently neutral electron donor ligands;

n is 0 or 1; typically n is 0;

m is 0, 1 or 2; typically m is 0;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently anionic ligands; generally $X^1$ and $X^2$ are independently halogen, trifluoroacetate, per-fluorophenolate, thiolate, alkylthio, arylthio or nitrate; typically $X^1$ and $X^2$ are independently Cl, Br, I or F; and $R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is phenyl, substituted phenyl or substituted 1-propenyl; or $R^1$ and $R^2$ are linked together to form an optionally substituted indenylidene.

In one embodiment of Formula (I), any two or more of $X^1$, $X^2$, $L^1$, $L^2$, $R^1$, and $R^2$ are optionally linked together to form a cyclic group, including bidentate or multidentate ligands; or any one or more of $X^1$, $X^2$, $L^1$, $L^2$, $R^1$, and $R^2$ is/are optionally attached to a support.

In one embodiment the invention provides catalysts, represented by the structure of Formula (I), wherein M is a Group 8 transition metal; generally M is ruthenium or osmium; typically M is ruthenium; m is 0, 1 or 2; typically m is 0; R is unsubstituted hydrocarbyl, substituted hydrocarbyl, unsubstituted heteroatom-containing hydrocarbyl, or substituted heteroatom-containing hydrocarbyl; typically R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; $X^1$ and $X^2$ are independently anionic ligands; generally $X^1$ and $X^2$ are independently halogen, trifluoroacetate, per-fluorophenolate, thiolate, alkylthio, arylthio or nitrate; typically $X^1$ and $X^2$ are independently Cl, Br, I or F; $R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene; n is 0, and $L^1$ is independently selected from phosphine, sulfonated phosphine, phosphite, phosphinite, phosphonite, arsine, stibine, ether (including cyclic ethers), amine, amide, imine, nitrile, carboxyl, nitrosyl, pyridine, substituted pyridine, imidazole, substituted imidazole, pyrazine, substituted pyrazine and thioether; typically $L^1$ is of the formula $PR^{H1}R^{H2}R^{H3}$, where $R^{H1}$, $R^{H2}$, and $R^{H3}$ are each independently substituted or unsubstituted aryl, or substituted or unsubstituted $C_1$-$C_{10}$ alkyl; typically, $R^{H1}$, $R^{H2}$, and $R^{H3}$ are each independently primary alkyl, secondary alkyl, or cycloalkyl.

In one embodiment the invention provides an olefin metathesis catalyst, represented by the structure of Formula (II):

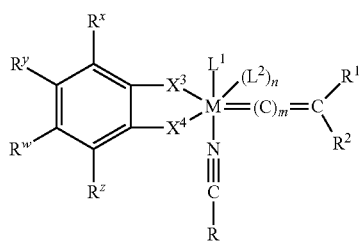

Formula (II)

wherein:

M is a Group 8 transition metal; generally M is ruthenium or osmium; typically M is ruthenium;

$L^1$ is a carbene;

$L^2$ is a neutral electron donor ligand;

n is 0 or 1; typically n is 0;

m is 0, 1 or 2; typically m is 0;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or typically, $R^1$ is hydrogen and $R^2$ is phenyl, substituted phenyl or substituted 1-propenyl; or $R^1$ and $R^2$ are linked together to form an optionally substituted indenylidene;

$X^3$ and $X^4$ are independently O or S; typically, $X^3$ and $X^4$ are each S; and $R^x$, $R^y$, $R^w$ and $R^z$ are independently hydrogen, halogen, unsubstituted hydrocarbyl, substituted hydrocarbyl, unsubstituted heteroatom-containing hydrocarbyl, or substituted heteroatom-containing hydrocarbyl; typically, $R^x$, $R^y$, $R^w$ and $R^z$ are each hydrogen.

In one embodiment, the invention provides an olefin metathesis catalyst, represented by the structure of Formula (III),

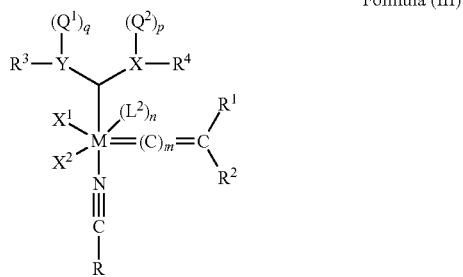

Formula (III)

wherein:

M is a Group 8 transition metal; generally M is ruthenium or osmium; typically M is ruthenium;

$L^2$ is a neutral electron donor ligand;

n is 0 or 1; typically n is 0;

m is 0, 1 or 2; typically m is 0;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently anionic ligands; generally $X^1$ and $X^2$ are independently halogen, trifluoroacetate, perfluorophenolate, thiolate, alkylthio, arylthio or nitrate; typically $X^1$ and $X^2$ are independently Cl, Br, I or F; and $R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or typically, $R^1$ is hydrogen and $R^2$ is phenyl, substituted phenyl or substituted 1-propenyl; or $R^1$ and $R^2$ are linked together to form an optionally substituted indenylidene;

X and Y are independently C, $CR^{3a}$, N, O, S, or P; only one of X or Y can be C or $CR^{3a}$; typically X and Y are each N;

$Q^1$, $Q^2$, $R^3$, $R^{3a}$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $Q^1$, $Q^2$, $R^3$, $R^{3a}$ and $R^4$ are optionally linked to X or Y via a linker such as unsubstituted hydrocarbylene, substituted hydrocarbylene, unsubstituted heteroatom-containing hydrocarbylene, substituted heteroatom-containing hydrocarbylene, or —(CO)—; typically $Q^1$, $Q^2$, $R^3$, $R^{3a}$ and $R^4$ are directly linked to X or Y; and p is 0 when X is O or S, p is 1 when X is N, P or $CR^{3a}$, and p is 2 when X is C; q is 0 when Y is O or S, q is 1 when Y is N, P or $CR^{3a}$, and q is 2 when X is C.

In one embodiment, the invention provides an olefin metathesis catalyst, represented by the structure of Formula (IV),

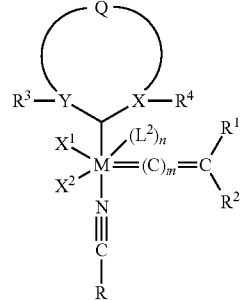

Formula (IV)

wherein:

M is a Group 8 transition metal; generally M is ruthenium or osmium; typically M is ruthenium;

$L^2$ is a neutral electron donor ligand;

n is 0 or 1; typically n is 0;

m is 0, 1 or 2; typically m is 0;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently anionic ligands; generally $X^1$ and $X^2$ are independently halogen, trifluoroacetate, perfluorophenolate, thiolate, alkylthio, arylthio or nitrate; typically $X^1$ and $X^2$ are independently Cl, Br, I or F;

$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; typically, $R^1$ is hydrogen and $R^2$ is unsubstituted phenyl, substituted phenyl or substituted 1-propenyl; or $R^1$ and $R^2$ are linked together to form an optionally substituted indenylidene;

X and Y are independently C, $CR^{3a}$, or N; only one of X or Y can be C or $CR^{3a}$; typically X and Y are each N;

$R^{3a}$ is hydrogen, unsubstituted hydrocarbyl, substituted hydrocarbyl, unsubstituted heteroatom-containing hydrocarbyl, or substituted heteroatom-containing hydrocarbyl;

Q is a linker, typically unsubstituted hydrocarbylene, substituted hydrocarbylene, unsubstituted heteroatom-containing hydrocarbylene, or substituted heteroatom-containing hydrocarbylene; generally Q is a two-atom linkage having the structure —[$CR^{11}R^{12}$]$_s$—[$CR^{13}R^{14}$]$_t$— or —[CR$^{11}$=CR$^{13}$]—; typically Q is —[CR$^{11}$R$^{12}$]$_s$—[CR$^{13}$R$^{14}$]$_t$—, wherein R$^{11}$, R$^{12}$, R$^{13}$, and R$^{14}$ are independently hydrogen, unsubstituted hydrocarbyl, substituted hydrocarbyl, unsubstituted heteroatom-containing hydrocarbyl, or substituted heteroatom-containing hydrocarbyl; typically R$^{11}$, R$^{12}$, R$^{13}$ and R$^{14}$ are independently hydrogen, unsubstituted C$_1$-C$_{12}$ alkyl, substituted C$_1$-C$_{12}$ alkyl, unsubstituted C$_1$-C$_{12}$ heteroalkyl, substituted C$_1$-C$_{12}$ heteroalkyl, unsubstituted phenyl, or substituted phenyl; "s" and "t" are independently 1 or 2; typically "s" and "t" are each 1; or any two of R$^{11}$, R$^{12}$, R$^{13}$, and R$^{14}$ are optionally linked together to form a substituted or unsubstituted, saturated or unsaturated ring structure; and R$^3$ and R$^4$ are independently hydrogen, unsubstituted hydrocarbyl, substituted hydrocarbyl, unsubstituted heteroatom-containing hydrocarbyl, or substituted heteroatom-containing hydrocarbyl; generally, R$^3$ and R$^4$ are independently unsubstituted C$_3$-C$_{10}$ cycloalkyl, substituted C$_3$-C$_{10}$ cycloalkyl, unsubstituted C$_5$-C$_{24}$ aryl, or C$_5$-C$_{24}$ aryl substituted with up to three substituents selected from: unsubstituted C$_1$-C$_{20}$ alkyl, substituted C$_1$-C$_{20}$ alkyl, unsubstituted C$_1$-C$_{20}$ heteroalkyl, substituted C$_1$-C$_{20}$ heteroalkyl, unsubstituted C$_5$-C$_{24}$ aryl, substituted C$_5$-C$_{24}$ aryl, unsubstituted C$_5$-C$_{24}$ heteroaryl, substituted C$_5$-C$_{24}$ heteroaryl, unsubstituted C$_6$-C$_{24}$ aralkyl, substituted C$_6$-C$_{24}$ aralkyl, unsubstituted C$_6$-C$_{24}$ alkaryl, substituted C$_6$-C$_{24}$ alkaryl and halide; typically, R$^3$ and R$^4$ are independently adamantyl, 2,4,6-trimethylphenyl (i.e., mesityl or Mes as defined herein), 2-iso-propyl-phenyl (IPP, Ipp or ipp), 2,6-di-iso-propylphenyl (i.e., DIPP or DiPP as defined herein) or, are 2-iso-propyl-6-methylphenyl (i.e., MIPP, Mipp or MiPP as defined herein).

In one embodiment of Formula (IV), R$^3$ and R$^4$ are independently aromatic, composed of one or two aromatic rings, e.g., R$^3$ and R$^4$ are independently unsubstituted phenyl, substituted phenyl, unsubstituted biphenyl, substituted biphenyl, or the like. As an example, R$^3$ and R$^4$ are each 2,4,6-trimethylphenyl. As another example, R$^3$ and R$^4$ are each 2,6-di-iso-propylphenyl. As another example, R$^3$ and R$^4$ are each 2-iso-propyl-6-methylphenyl. As another example, R$^3$ and R$^4$ are each 2-iso-propyl-phenyl.

In one embodiment of Formula (IV), M is ruthenium; n is 1; L$^2$ is N≡C—R; m is 0; R is C$_1$-C$_{10}$ alkyl; X$^1$ and X$^2$ are independently Cl, Br, I or F; X and Y are each N; R$^1$ is hydrogen; R$^2$ is phenyl or 2-methyl-1-propenyl; Q is —[CR$^{11}$R$^{12}$]$_s$—[CR$^{13}$R$^{14}$]$_t$— or —[CR$^{11}$=CR$^{13}$]— wherein R$^{11}$, R$^{12}$, R$^{13}$, and R$^{14}$ are each hydrogen; and "s" and "t" are each 1; and R$^3$ and R$^4$ are independently 2,4,6-trimethylphenyl, 2,6-di-iso-propylphenyl, 2-iso-propyl-phenyl or 2-iso-propyl-6-methyl phenyl.

In one embodiment of Formula (IV), M is ruthenium; n is 1; L$^2$ is N≡C—R; m is 0; R is C$_1$-C$_{10}$ alkyl; X$^1$ and X$^2$ are independently Cl, Br, I or F; X and Y are each N; R$^1$ is hydrogen; R$^2$ is phenyl or 2-methyl-1-propenyl; Q is —[CR$^{11}$R$^{12}$]$_s$—[CR$^{13}$R$^{14}$]$_t$— wherein R$^{11}$, R$^{12}$, R$^{13}$, and R$^{14}$ are each hydrogen; and "s" and "t" are each 1; and R$^3$ and R$^4$ are independently 2,4,6-trimethylphenyl, 2,6-di-iso-propylphenyl, 2-iso-propyl-phenyl or 2-iso-propyl-6-methyl phenyl.

In one embodiment of Formula (IV), M is ruthenium; n is 1; L$^2$ is N≡C—R; m is 0; R is CH$_3$; X$^1$ and X$^2$ are each Cl; X and Y are each N; R$^1$ is hydrogen; R$^2$ is phenyl; Q is —[CR$^{11}$R$^{12}$]$_s$—[CR$^{13}$R$^{14}$]$_t$— wherein R$^{11}$, R$^{12}$, R$^{13}$, and R$^{14}$ are each hydrogen; and "s" and "t" are each 1; and R$^3$ and R$^4$ are each 2,4,6-trimethylphenyl.

In one embodiment of Formula (IV), M is ruthenium; n is 1; L$^2$ is N≡C—R; m is 0; R is CH$_3$; X$^1$ and X$^2$ are each Cl; X and Y are each N; R$^1$ and R$^2$ form together 3-phenyl-indenylidene; Q is —[CR$^{11}$R$^{12}$]$_s$—[CR$^{13}$R$^{14}$]$_t$— wherein R$^{11}$, R$^{12}$, R$^{13}$, and R$^{14}$ are each hydrogen; and "s" and "t" are each 1; and R$^3$ and R$^4$ are each 2,4,6-trimethylphenyl.

In one embodiment of Formula (IV), M is ruthenium; n is 0; m is 0; R is C$_1$-C$_{10}$ alkyl; X$^1$ and X$^2$ are independently Cl, Br, I or F; X and Y are each N; R$^1$ is hydrogen; R$^2$ is phenyl or 2-methyl-1-propenyl; Q is —[CR$^{11}$R$^{12}$]$_s$—[CR$^{13}$R$^{14}$]$_t$— or —[CR$^{11}$=CR$^{13}$]— wherein R$^{11}$, R$^{12}$, R$^{13}$, and R$^{14}$ are each hydrogen; and "s" and "t" are each 1; and R$^3$ and R$^4$ are independently 2,4,6-trimethylphenyl, 2,6-di-iso-propylphenyl, 2-iso-propyl-phenyl or 2-iso-propyl-6-methyl phenyl.

In one embodiment of Formula (IV), M is ruthenium; n is 0; m is 0; R is C$_1$-C$_{10}$ alkyl; X$^1$ and X$^2$ are independently Cl; X and Y are each N; R$^1$ is hydrogen; R$^2$ is phenyl or 2-methyl-1-propenyl; Q is —[CR$^{11}$R$^{12}$]$_s$—[CR$^{13}$R$^{14}$]$_t$— wherein R$^{11}$, R$^{12}$, R$^{13}$, and R$^{14}$ are each hydrogen; and "s" and "t" are each 1; and R$^3$ and R$^4$ are independently 2,4,6-trimethylphenyl, 2,6-di-iso-propylphenyl, 2-iso-propyl-phenyl or 2-iso-propyl-6-methyl phenyl.

In one embodiment of Formula (IV), M is ruthenium; n is 0; m is 0; R is C$_1$-C$_{10}$ alkyl; X$^1$ and X$^2$ are independently Cl, Br, I or F; X and Y are each N; R$^1$ is hydrogen; R$^2$ is phenyl, 2-iso-propoxy-phenyl or 2-methyl-1-propenyl; or R$^1$ and R$^2$ are linked together to form 3-phenyl-1-indenylidene; Q is —[CR$^{11}$R$^{12}$]$_s$—[CR$^{13}$R$^{14}$]$_t$— wherein R$^{11}$, R$^{12}$, R$^1$, and R$^{14}$ are each hydrogen; and "s" and "t" are each 1; and R$^3$ and R$^4$ are independently 2,4,6-trimethylphenyl, 2,6-di-iso-propylphenyl, 2-iso-propyl-phenyl or 2-iso-propyl-6-methyl phenyl.

In one embodiment of Formula (IV), M is ruthenium; n is 0; m is 0; R is CH$_3$; X$^1$ and X$^2$ are each Cl; X and Y are each N; R$^1$ is hydrogen; R$^2$ is phenyl; Q is —[CR$^{11}$R$^{12}$]$_s$—[CR$^{13}$R$^{14}$]$_t$— wherein R$^{11}$, R$^{12}$, R$^{13}$, and R$^{14}$ are each hydrogen; and "s" and "t" are each 1; and R$^3$ and R$^4$ are each 2,4,6-trimethylphenyl.

In one embodiment of Formula (IV), M is ruthenium; n is 0; m is 0; R is CH$_3$; X$^1$ and X$^2$ are each Cl; X and Y are each N; R$^1$ and R$^2$ form 3-phenyl-indenylidene; Q is —[CR$^{11}$R$^{12}$]$_s$—[CR$^{13}$R$^{14}$]$_t$— wherein R$^{11}$, R$^{12}$, R$^{13}$, and R$^{14}$ are each hydrogen; and "s" and "t" are each 1; and R$^3$ and R$^4$ are each 2,4,6-trimethylphenyl.

In one embodiment, the invention provides an olefin metathesis catalyst, represented by the structure of Formula (IV), wherein:

M is Ru;

n is 0;

m is 0;

X$^1$ and X$^2$ are independently halogen;

R$^1$ is hydrogen;

R$^2$ is unsubstituted hydrocarbyl, substituted hydrocarbyl, unsubstituted heteroatom-containing hydrocarbyl, or substituted heteroatom-containing hydrocarbyl; or R$^1$ and R$^2$ are linked together to form an optionally substituted indenylidene;

R is unsubstituted hydrocarbyl, substituted hydrocarbyl, unsubstituted heteroatom-containing hydrocarbyl, or substituted heteroatom-containing hydrocarbyl; generally R is unsubstituted C$_1$-C$_{10}$ alkyl, substituted C$_1$-C$_{10}$ alkyl, unsubstituted C$_3$-C$_8$ cycloalkyl, substituted C$_3$-C$_8$ cycloalkyl, unsubstituted C$_5$-C$_{24}$ aryl or substituted C$_5$-C$_{24}$ aryl; typically R is methyl, ethyl, n-propyl, iso-propyl, n-butyl, tert-butyl, or phenyl;

X and Y are each N;

Q is —(CH$_2$—CH$_2$)— (i.e., a two-atom linkage having the structure —[CR$^{11}$R$^{12}$]$_s$—[CR$^{13}$R$^{14}$]$_t$—; wherein R$^{11}$, R$^{12}$, R$^{13}$, and R$^{14}$ are each hydrogen; and "s" and "t" are each 1);

R$^3$ is unsubstituted hydrocarbyl, substituted hydrocarbyl, unsubstituted heteroatom-containing hydrocarbyl, or substituted heteroatom-containing hydrocarbyl; generally R$^3$ is unsubstituted C$_3$-C$_{10}$ cycloalkyl, substituted C$_3$-C$_{10}$ cycloalkyl, unsubstituted C$_5$-C$_{24}$ aryl, or C$_5$-C$_{24}$ aryl substituted with up to three substituents selected from: unsubstituted C$_1$-C$_{20}$ alkyl, substituted C$_1$-C$_{20}$ alkyl, unsubstituted C$_1$-C$_{20}$ heteroalkyl, substituted C$_1$-C$_{20}$ heteroalkyl, unsubstituted C$_5$-C$_{24}$ aryl, substituted C$_5$-C$_{24}$ aryl, unsubstituted C$_5$-C$_{24}$ heteroaryl, substituted C$_5$-C$_{24}$ heteroaryl, unsubstituted C$_6$-C$_{24}$ aralkyl, substituted C$_6$-C$_{24}$ aralkyl, unsubstituted C$_6$-C$_{24}$ alkaryl, substituted C$_6$-C$_{24}$ alkaryl and halide; and R$^4$ is unsubstituted hydrocarbyl, substituted hydrocarbyl, unsubstituted heteroatom-containing hydrocarbyl, or substituted heteroatom-containing hydrocarbyl; generally R$^4$ is unsubstituted C$_3$-C$_{10}$ cycloalkyl, substituted C$_3$-C$_{10}$ cycloalkyl, unsubstituted C$_5$-C$_{24}$ aryl, or C$_5$-C$_{24}$ aryl substituted with up to three substituents selected from: unsubstituted C$_1$-C$_{20}$ alkyl, substituted C$_1$-C$_{20}$ alkyl, unsubstituted C$_1$-C$_{20}$ heteroalkyl, substituted C$_1$-C$_{20}$ heteroalkyl, unsubstituted C$_5$-C$_{24}$ aryl, substituted C$_5$-C$_{24}$ aryl, unsubstituted C$_5$-C$_{24}$ heteroaryl, substituted C$_5$-C$_{24}$ heteroaryl, unsubstituted C$_6$-C$_{24}$ aralkyl, substituted C$_6$-C$_{24}$ aralkyl, unsubstituted C$_6$-C$_{24}$ alkaryl, substituted C$_6$-C$_{24}$ alkaryl and halide.

Therefore, the olefin metathesis catalyst of Formula (IV), can also be represented by the structure of Formula (V):

Formula (V)

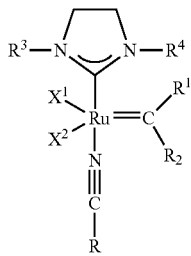

wherein:

R$^1$ is hydrogen;

R$^2$ is unsubstituted hydrocarbyl, substituted hydrocarbyl, unsubstituted heteroatom-containing hydrocarbyl, or substituted heteroatom-containing hydrocarbyl; typically R$^2$ is unsubstituted phenyl, substituted phenyl or substituted 1-propenyl; or R$^1$ and R$^2$ are linked together to form an optionally substituted indenylidene;

R is unsubstituted hydrocarbyl, substituted hydrocarbyl, unsubstituted heteroatom-containing hydrocarbyl, or substituted heteroatom-containing hydrocarbyl; typically R is unsubstituted C$_1$-C$_{10}$ alkyl, substituted C$_1$-C$_{10}$ alkyl, unsubstituted C$_3$-C$_8$ cycloalkyl, substituted C$_3$-C$_8$ cycloalkyl, unsubstituted C$_5$-C$_{24}$ aryl or substituted C$_5$-C$_{24}$ aryl;

X$^1$ and X$^2$ are independently halogen, trifluoroacetate, per-fluorophenolate, thiolate, alkylthio, arylthio or nitrate; typically X$^1$ and X$^2$ are independently Cl, Br, I or F; and R$^3$ and R$^4$ are independently hydrogen, unsubstituted hydrocarbyl, substituted hydrocarbyl, unsubstituted heteroatom-containing hydrocarbyl, or substituted heteroatom-containing hydrocarbyl; generally, R$^3$ and R$^4$ are independently unsubstituted C$_3$-C$_{10}$ cycloalkyl, substituted C$_3$-C$_{10}$ cycloalkyl, unsubstituted C$_5$-C$_{24}$ aryl, or C$_5$-C$_{24}$ aryl substituted with up to three substituents selected from: unsubstituted C$_1$-C$_{20}$ alkyl, substituted C$_1$-C$_{20}$ alkyl, unsubstituted C$_1$-C$_{20}$ heteroalkyl, substituted C$_1$-C$_{20}$ heteroalkyl, unsubstituted C$_5$-C$_{24}$ aryl, substituted C$_5$-C$_{24}$ aryl, unsubstituted C$_5$-C$_{24}$ heteroaryl, substituted C$_5$-C$_{24}$ heteroaryl, unsubstituted C$_6$-C$_{24}$ aralkyl, substituted C$_6$-C$_{24}$ aralkyl, unsubstituted C$_6$-C$_{24}$ alkaryl, substituted C$_6$-C$_{24}$ alkaryl and halide; typically, R$^3$ and R$^4$ are independently 2,4,6-trimethylphenyl, 2,6-di-iso-propylphenyl, 2-iso-propyl-phenyl or are 2-iso-propyl-6-methyl phenyl.

In one embodiment of Formula (V), R$^1$ is hydrogen; R$^2$ is phenyl, 2-iso-propyl-phenyl, 2-iso-propoxy-phenyl (

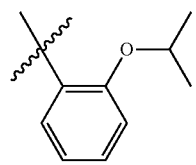 [SMILES: *c1ccccc1OC(C)C]

), or 2-methyl-1-propenyl (—CH═C(CH$_3$)$_2$ or

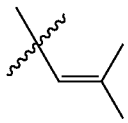

or R$^1$ and R$^2$ are linked together to form 3-phenylinden-1-ylidene (

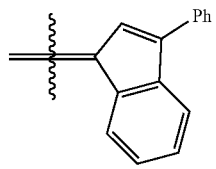 [SMILES: *=C1C=C(c2ccccc2)c2ccccc21]

);

R is methyl, ethyl, n-propyl, iso-propyl, n-butyl, tert-butyl, or phenyl;

X$^1$ and X$^2$ are each Cl; and

R$^3$ and R$^4$ are independently phenyl, 2,4,6-trimethylphenyl, 2,6-di-iso-propylphenyl, 2-iso-propyl-phenyl or 2-iso-propyl-6-methyl phenyl.

Non-limiting examples of olefin metathesis catalysts represented by the structure of Formula (V) are described in Table (1), wherein X$^1$ is Cl and X$^2$ is Cl.

TABLE (1)

| Catalyst | R$^1$ | R$^2$ | R | R$^3$ | R$^4$ |
| --- | --- | --- | --- | --- | --- |
| 1 | H | Ph | Me | DIPP | DIPP |
| 2 | H | Ph | Me | Mes | Mes |
| 3 | H | Ph | Me | Mipp | Mipp |
| 4 | H | Ph | Et | DIPP | DIPP |
| 5 | H | Ph | Et | Mes | Mes |
| 6 | H | Ph | Et | Mipp | Mipp |
| 7 | H | Ph | Ph | DIPP | DIPP |
| 8 | H | Ph | Ph | Mes | Mes |
| 9 | H | Ph | Ph | Mipp | Mipp |
| 10 | H | Ph | Ph | Ipp | Ipp |

TABLE (1)-continued

| Catalyst | R¹ | R² | R | R³ | R⁴ |
|---|---|---|---|---|---|
| 11 | H | 2-isopropoxyphenyl | Me | DIPP | DIPP |
| 12 | H | 2-isopropoxyphenyl | Me | Mes | Mes |
| 13 | H | 2-isopropoxyphenyl | Me | Mipp | Mipp |
| 14 | H | 2-isopropoxyphenyl | Et | DIPP | DIPP |
| 15 | H | 2-isopropoxyphenyl | Et | Mes | Mes |
| 16 | H | 2-isopropoxyphenyl | Et | Mipp | Mipp |
| 17 | H | 2-isopropoxyphenyl | Ph | DIPP | DIPP |
| 18 | H | 2-isopropoxyphenyl | Ph | Mes | Mes |
| 19 | H | 2-isopropoxyphenyl | Ph | Mipp | Mipp |
| 20 | H | 2-isopropoxyphenyl | Ph | Ipp | Ipp |
| 21 | H | 2-methylpropenyl | Me | DIPP | DIPP |
| 22 | H | 2-methylpropenyl | Me | Mes | Mes |
| 23 | H | 2-methylpropenyl | Me | Mipp | Mipp |
| 24 | H | 2-methylpropenyl | Et | DIPP | DIPP |
| 25 | H | 2-methylpropenyl | Et | Mes | Mes |
| 26 | H | 2-methylpropenyl | Et | Mipp | Mipp |
| 27 | H | 2-methylpropenyl | Ph | DIPP | DIPP |
| 28 | H | 2-methylpropenyl | Ph | Mes | Mes |
| 29 | H | 2-methylpropenyl | Ph | Mipp | Mipp |
| 30 | H | 2-methylpropenyl | Ph | Ipp | Ipp |
| 31 | (3-phenyl-indenylidene) | | Me | DIPP | DIPP |

TABLE (1)-continued

| Catalyst | R¹ | R² | R | R³ | R⁴ |
|---|---|---|---|---|---|
| 32 | | indenylidene-Ph | Me | Mes | Mes |
| 33 | | indenylidene-Ph | Me | Mipp | Mipp |
| 34 | | indenylidene-Ph | Et | DIPP | DIPP |
| 35 | | indenylidene-Ph | Et | Mes | Mes |
| 36 | | indenylidene-Ph | Et | Mipp | Mipp |
| 37 | | indenylidene-Ph | Ph | DIPP | DIPP |
| 38 | | indenylidene-Ph | Ph | Mes | Mes |
| 39 | | indenylidene-Ph | Ph | Mipp | Mipp |
| 40 | | indenylidene-Ph | Ph | Ipp | Ipp | wherein: Mes is

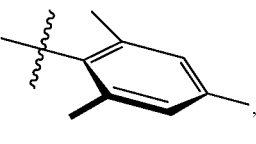

Mipp is

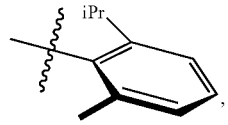

DIPP is

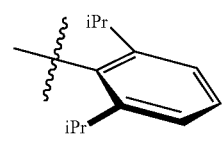

an Ipp is

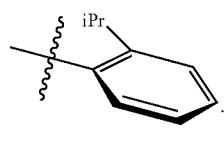

In one embodiment, the invention provides an olefin metathesis catalyst, represented by the structure of Formula (IV), wherein:
M is Ru;
n is 0;
m is 0;
$X^1$ and $X^2$ are independently halogen;
$R^1$ is hydrogen;
$R^2$ is unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;
R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;
X and Y are each N;
Q is —(CH=CH)— (i.e., a two-atom linkage having the structure —[$CR^{11}$=$CR^{13}$]—; wherein $R^{11}$ and $R^{13}$ are each hydrogen);
$R^3$ is unsubstituted hydrocarbyl, substituted hydrocarbyl, unsubstituted heteroatom-containing hydrocarbyl, or substituted heteroatom-containing hydrocarbyl; generally $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; and $R^4$ is unsubstituted hydrocarbyl, substituted hydrocarbyl, unsubstituted heteroatom-containing hydrocarbyl, or substituted heteroatom-containing hydrocarbyl; generally $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide.

Therefore, the olefin metathesis catalyst of Formula (IV), can also be represented by the structure of Formula (VI):

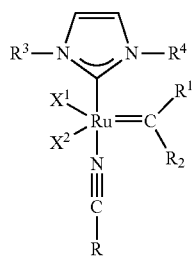

Formula (VI)

wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; typically $R^2$ is phenyl, 2-iso-propylphenyl, 2-iso-propoxy-phenyl or 2-methyl-1-propenyl; or $R^1$ and $R^2$ are linked together to form an optionally substituted indenylidene;

R is unsubstituted hydrocarbyl, substituted hydrocarbyl, unsubstituted heteroatom-containing hydrocarbyl, or substituted heteroatom-containing hydrocarbyl; typically R is substituted $C_1$-$C_{10}$ alkyl, unsubstituted $C_1$-$C_{10}$ alkyl, unsubstituted $C_3$-$C_8$ cycloalkyl, substituted $C_3$-$C_8$ cycloalkyl, substituted $C_5$-$C_{24}$ aryl or unsubstituted $C_5$-$C_{24}$ aryl;

$X^1$ and $X^2$ are independently halogen, trifluoroacetate, per-fluorophenolate, thiolate, alkylthio, arylthio or nitrate; typically $X^1$ and $X^2$ are independently Cl, Br, I or F; and $R^3$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $R^3$ and $R^4$ are independently unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ and $R^4$ are independently 2,4,6-trimethylphenyl, 2,6-di-iso-propylphenyl, 2-iso-propyl-phenyl or 2-iso-propyl-6-methyl phenyl.

In one embodiment of Formula (VI) $R^1$ is hydrogen; $R^2$ is phenyl, 2-iso-propoxy-phenyl, or 2-methyl-1-propenyl; or $R^1$ and $R^2$ are linked together to form 3-phenylinden-1-ylidene;

R is methyl, ethyl, n-propyl, iso-propyl, n-butyl, tert-butyl, or phenyl;

$X^1$ and $X^2$ are each Cl; and $R^3$ and $R^4$ are independently phenyl, 2,4,6-trimethylphenyl, 2,6-di-iso-propylphenyl, 2-iso-propyl-phenyl or 2-iso-propyl-6-methyl phenyl.

Non-limiting examples of olefin metathesis catalysts represented by the structure of Formula (VI) are described in Table (2), wherein $X^1$ is Cl and $X^2$ is Cl.

TABLE (2)

| Catalyst | $R^1$ | $R^2$ | R | $R^3$ | $R^4$ |
|---|---|---|---|---|---|
| 41 | H | Ph | Me | DIPP | DIPP |
| 42 | H | Ph | Me | Mes | Mes |
| 43 | H | Ph | Me | Mipp | Mipp |
| 44 | H | Ph | Et | DIPP | DIPP |
| 45 | H | Ph | Et | Mes | Mes |
| 46 | H | Ph | Et | Mipp | Mipp |
| 47 | H | Ph | Ph | DIPP | DIPP |
| 48 | H | Ph | Ph | Mes | Mes |
| 49 | H | Ph | Ph | Mipp | Mipp |
| 50 | H | Ph | Ph | Ipp | Ipp |
| 51 | H | 2-iso-propoxy-phenyl | Me | DIPP | DIPP |
| 52 | H | 2-iso-propoxy-phenyl | Me | Mes | Mes |
| 53 | H | 2-iso-propoxy-phenyl | Me | Mipp | Mipp |
| 54 | H | 2-iso-propoxy-phenyl | Et | DIPP | DIPP |
| 55 | H | 2-iso-propoxy-phenyl | Et | Mes | Mes |
| 56 | H | 2-iso-propoxy-phenyl | Et | Mipp | Mipp |

TABLE (2)-continued
| Catalyst | R¹ | R² | R | R³ | R⁴ |
|---|---|---|---|---|---|
| 57 | H | 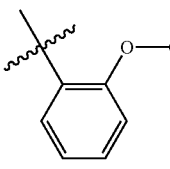 | Ph | DIPP | DIPP |
| 58 | H | 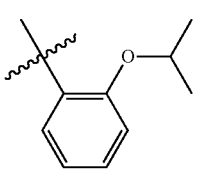 [SMILES: *c1ccccc1OC(C)C] | Ph | Mes | Mes |
| 59 | H | 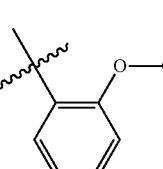 | Ph | Mipp | Mipp |
| 60 | H | 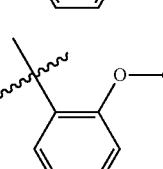 | Ph | Ipp | Ipp |
| 61 | H | 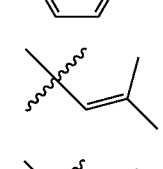 | Me | DIPP | DIPP |
| 62 | H | 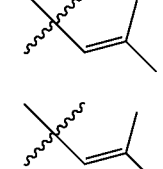 | Me | Mes | Mes |
| 63 | H | 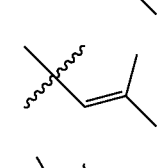 | Me | Mipp | Mipp |
| 64 | H | 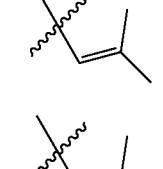 | Et | DIPP | DIPP |
| 65 | H | 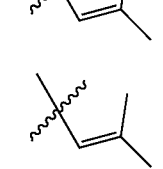 | Et | Mes | Mes |
| 66 | H | 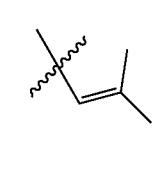 [SMILES: *C=C(C)C] | Et | Mipp | Mipp |
| 67 | H |  | Ph | DIPP | DIPP |
| 68 | H | 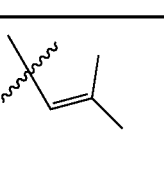 | Ph | Mes | Mes |
TABLE (2)-continued
| Catalyst | R¹ | R² | R | R³ | R⁴ |
|---|---|---|---|---|---|
| 69 | H | 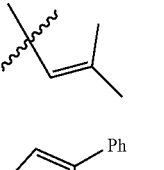 | Ph | Mipp | Mipp |
| 70 | H | 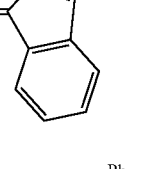 | Ph | Mipp | Mipp |
| 71 | | 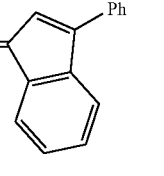 | Me | DIPP | DIPP |
| 72 | | 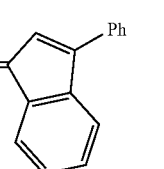 | Me | Mes | Mes |
| 73 | | 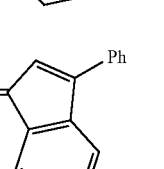 | Me | Mipp | Mipp |
| 74 | | 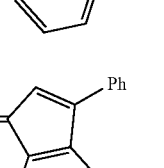 | Et | DIPP | DIPP |
| 75 | | 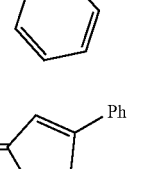 | Et | Mes | Mes |
| 76 | | 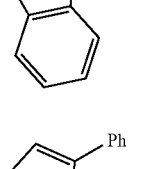 | Et | Mipp | Mipp |
| 77 | | | Ph | DIPP | DIPP |

TABLE (2)-continued

| Catalyst | R¹ | R² | R | R³ | R⁴ |
|---|---|---|---|---|---|
| 78 |  | Ph | Ph | Mes | Mes |
| 79 |  | Ph | Ph | Mipp | Mipp |
| 80 |  | Ph | Ph | Ipp | Ipp |

In one embodiment, the invention provides an olefin metathesis catalyst, represented by the structure of Formula (IV), wherein:

M is Ru;
n is 0;
m is 0;
$X^1$ and $X^2$ are independently halogen;
$R^1$ is hydrogen;
$R^2$ is unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;
R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;
Y is N;
X is $CR^{3a}$;
$R^{3a}$ is hydrogen, unsubstituted hydrocarbyl, substituted hydrocarbyl, unsubstituted heteroatom-containing hydrocarbyl, or substituted heteroatom-containing hydrocarbyl; or $R^{3a}$ and $R^4$ can form together a five to ten membered cycloalkyl or heterocyclic ring, with the carbon atom to which they are attached;
Q is a two-atom linkage having the structure —[$CR^{11}R^{12}$]$_s$—[$CR^{13}R^{14}$]$_t$—; $R^{11}$, $R^{12}$, $R^{13}$, and $R^{14}$ are independently hydrogen, unsubstituted hydrocarbyl, substituted hydrocarbyl, unsubstituted heteroatom-containing hydrocarbyl, or substituted heteroatom-containing hydrocarbyl; typically $R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted phenyl, or substituted phenyl;
"s" and "t" are each 1;
$R^3$ is unsubstituted hydrocarbyl, substituted hydrocarbyl, unsubstituted heteroatom-containing hydrocarbyl, or substituted heteroatom-containing hydrocarbyl; generally $R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; and
$R^4$ is unsubstituted hydrocarbyl, substituted hydrocarbyl, unsubstituted heteroatom-containing hydrocarbyl, or substituted heteroatom-containing hydrocarbyl; generally $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide.

Therefore, the olefin metathesis catalyst of Formula (IV), can also be represented by the structure of Formula (VII):

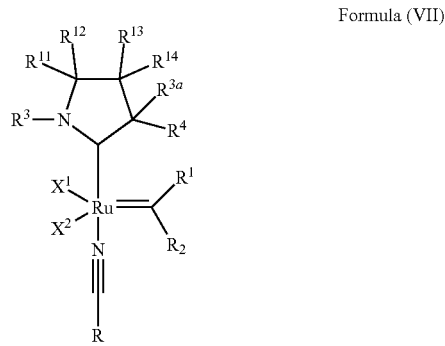

Formula (VII)

wherein:
$R^1$ is hydrogen;
$R^2$ is unsubstituted hydrocarbyl, substituted hydrocarbyl, unsubstituted heteroatom-containing hydrocarbyl, or substituted heteroatom-containing hydrocarbyl; generally, $R^2$ is unsubstituted phenyl, substituted phenyl or substituted 1-propenyl; or $R^1$ and $R^2$ are linked together to form an optionally substituted indenylidene;
$X^1$ and $X^2$ are independently halogen, trifluoroacetate, per-fluorophenolate, thiolate, alkylthio, arylthio or nitrate; generally $X^1$ and $X^2$ are independently Cl, Br, I or F; typically $X^1$ and $X^2$ are each Cl;
$R^3$ is unsubstituted hydrocarbyl, substituted hydrocarbyl, unsubstituted heteroatom containing hydrocarbyl, or substituted heteroatom-containing hydrocarbyl; generally, $R^3$ is unsubstituted $C_3$-$C_{10}$ cycloalkyl, substituted $C_3$-$C_{10}$ cycloalkyl, unsubstituted $C_5$-$C_{24}$ aryl, $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ is adamantyl, 2,4,6-trimethylphenyl, 2,6-di-iso-propylphenyl, 2-methyl-6-tert-butylphenyl, 2-iso-propyl-6- methylphenyl, 2-iso-propyl-phenyl, 2,6-di-ethylphenyl, 2-ethyl-6-methylphenyl or 2-methyl-phenyl;

$R^{11}$, $R^{12}$, $R^{13}$ and $R^{14}$ are independently hydrogen, unsubstituted hydrocarbyl, substituted hydrocarbyl, unsubstituted heteroatom-containing hydrocarbyl, or substituted heteroatom-containing hydrocarbyl; generally, $R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted $C_4$-$C_{12}$ cycloalkyl, substituted $C_4$-$C_{12}$ cycloalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ heteroaralkyl or substituted $C_6$-$C_{24}$ heteroaralkyl; typically, $R^{11}$ and $R^{12}$ are each methyl and $R^{13}$ and $R^{14}$ are each hydrogen;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$R^{3a}$ is hydrogen, unsubstituted hydrocarbyl, substituted hydrocarbyl, unsubstituted heteroatom-containing hydrocarbyl, or substituted heteroatom-containing hydrocarbyl; generally, $R^{3a}$ is unsubstituted $C_1$-$C_{12}$ alkyl, substituted $C_1$-$C_{12}$ alkyl, unsubstituted $C_4$-$C_{12}$ cycloalkyl, substituted $C_4$-$C_{12}$ cycloalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ heteroaralkyl or substituted $C_6$-$C_{24}$ heteroaralkyl; typically $R^{3a}$ is methyl, ethyl, n-propyl, or phenyl; and $R^4$ is hydrogen, unsubstituted hydrocarbyl, substituted hydrocarbyl, unsubstituted heteroatom-containing hydrocarbyl, or substituted heteroatom-containing hydrocarbyl; generally, $R^4$ is unsubstituted $C_1$-$C_{12}$ alkyl, substituted $C_1$-$C_{12}$ alkyl, unsubstituted $C_4$-$C_{12}$ cycloalkyl, substituted $C_4$-$C_{12}$ cycloalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ heteroaralkyl or substituted $C_6$-$C_{24}$ heteroaralkyl; typically $R^4$ is methyl, ethyl, n-propyl, or phenyl; or $R^4$ together with $R^{3a}$ can form a five- to ten-membered cycloalkyl or heterocyclic ring, with the carbon atom to which they are attached.

Non-limiting examples of olefin metathesis catalysts represented by the structure of Formula (VII) are described in Table (3), wherein $X^1$ is Cl, $X^2$ is Cl, $R^{11}$ is methyl, $R^{12}$ is methyl, $R^{13}$ is hydrogen, $R^{14}$ is hydrogen and R is methyl.

TABLE (3)

| Catalyst | $R^1$ | $R^2$ | $R^3$ | $R^{3a}$ | $R^4$ |
|---|---|---|---|---|---|
| 81 | H | Ph | 2-Me—$C_6H_5$ | Me | Me |
| 82 | H | Ph | Mes | Me | Me |
| 83 | H | Ph | Mipp | Me | Me |
| 84 | H | Ph | EMP | Me | Me |
| 85 | H | Ph | DIPP | Me | Me |
| 86 | H | Ph | IPP | Me | Me |
| 87 | H | isobutenyl | 2-Me—$C_6H_5$ | Me | Me |
| 88 | H | isobutenyl | Mes | Me | Me |
| 89 | H | isobutenyl | Mipp | Me | Me |
| 90 | H | isobutenyl | EMP | Me | Me |
| 91 | H | isobutenyl | DIPP | Me | Me |
| 92 | H | isobutenyl | IPP | Me | Me |
| 93 | H | 2-isopropoxyphenyl | 2-Me—$C_6H_5$ | Me | Me |
| 94 | H | 2-isopropoxyphenyl | Mes | Me | Me |
| 95 | H | 2-isopropoxyphenyl | Mipp | Me | Me |
| 96 | H | 2-isopropoxyphenyl | EMP | Me | Me |
| 97 | H | 2-isopropoxyphenyl | DIPP | Me | Me |
| 98 | H | 2-isopropoxyphenyl | IPP | Me | Me |

TABLE (3)-continued

| Catalyst | R¹ | R² | R³ | R³ᵃ | R⁴ |
|---|---|---|---|---|---|
| 99 | | 3-Ph-indenylidene | 2-Me—C₆H₅ | Me | Me |
| 100 | | 3-Ph-indenylidene | Mes | Me | Me |
| 101 | | 3-Ph-indenylidene | Mipp | Me | Me |
| 102 | | 3-Ph-indenylidene | EMP | Me | Me |
| 103 | | 3-Ph-indenylidene | DIPP | Me | Me |
| 104 | | 3-Ph-indenylidene | IPP | Me | Me |
| 105 | H | Ph | 2-Me—C₆H₅ | Me | Me |
| 106 | H | Ph | Mes | Me | Me |
| 107 | H | Ph | Mipp | Me | Me |
| 108 | H | Ph | EMP | Me | Me |
| 109 | H | Ph | DIPP | Me | Me |
| 110 | H | Ph | IPP | Me | Me |
| 111 | H | 2-isopropoxyphenyl | 2-Me—C₆H₅ | Me | Me |
| 112 | H | 2-isopropoxyphenyl | Mes | Me | Me |
| 113 | H | 2-isopropoxyphenyl | Mipp | Me | Me |
| 114 | H | 2-isopropoxyphenyl | EMP | Me | Me |
| 115 | H | 2-isopropoxyphenyl | DIPP | Me | Me |
| 116 | H | 2-isopropoxyphenyl | IPP | Me | Me |
| 117 | H | 2-methylpropenyl | 2-Me—C₆H₅ | Me | Me |
| 118 | H | 2-methylpropenyl | Mes | Me | Me |
| 119 | H | 2-methylpropenyl | Mipp | Me | Me |
| 120 | H | 2-methylpropenyl | EMP | Me | Me |
| 121 | H | 2-methylpropenyl | DIPP | Me | Me |
| 122 | H | 2-methylpropenyl | IPP | Me | Me |
| 123 | | 3-Ph-indenylidene | 2-Me—C₆H₅ | Me | Me |

TABLE (3)-continued

| Catalyst | R$^1$ | R$^2$ | R$^3$ | R$^{3a}$ | R$^4$ |
|---|---|---|---|---|---|
| 124 | | 1-(3-phenyl-indenylidene) | Mes | Me | Me |
| 125 | | 1-(3-phenyl-indenylidene) | Mipp | Me | Me |
| 126 | | 1-(3-phenyl-indenylidene) | EMP | Me | Me |
| 127 | | 1-(3-phenyl-indenylidene) | DIPP | Me | Me |
| 128 | | 1-(3-phenyl-indenylidene) | IPP | Me | Me |
| 129 | H | Ph | 2-Me—C$_6$H$_5$ | Me | Me |
| 130 | H | Ph | Mes | Me | Me |
| 131 | H | Ph | Mipp | Me | Me |
| 132 | H | Ph | EMP | Me | Me |
| 133 | H | Ph | DIPP | Me | Me |
| 134 | H | Ph | IPP | Me | Me |
| 135 | H | 2-methylprop-1-en-1-yl | 2-Me—C$_6$H$_5$ | Me | Me |
| 136 | H | 2-methylprop-1-en-1-yl | Mes | Me | Me |
| 137 | H | 2-methylprop-1-en-1-yl | Mipp | Me | Me |
| 138 | H | 2-methylprop-1-en-1-yl | EMP | Me | Me |
| 139 | H | 2-methylprop-1-en-1-yl | DIPP | Me | Me |
| 140 | H | 2-methylprop-1-en-1-yl | IPP | Me | Me |
| 141 | H | 2-isopropoxyphenyl | 2-Me—C$_6$H$_5$ | Me | Me |
| 142 | H | 2-isopropoxyphenyl | Mes | Me | Me |
| 143 | H | 2-isopropoxyphenyl | Mipp | Me | Me |
| 144 | H | 2-isopropoxyphenyl | EMP | Me | Me |
| 145 | H | 2-isopropoxyphenyl | DIPP | Me | Me |
| 146 | H | 2-isopropoxyphenyl | IPP | Me | Me |
| 147 | | 1-(3-phenyl-indenylidene) | 2-Me—C$_6$H$_5$ | Me | Me |
| 148 | | 1-(3-phenyl-indenylidene) | Mes | Me | Me |

TABLE (3)-continued

| Catalyst | R$^1$ | R$^2$ | R$^3$ | R$^{3a}$ | R$^4$ |
|---|---|---|---|---|---|
| 149 | | =⟨indenyl-Ph⟩ | Mipp | Me | Me |
| 150 | | =⟨indenyl-Ph⟩ | EMP | Me | Me |
| 151 | | =⟨indenyl-Ph⟩ | DIPP | Me | Me |
| 152 | | =⟨indenyl-Ph⟩ | IPP | Me | Me | wherein EMP is "

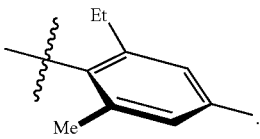

"

In another embodiment of Formula (IV), the invention provides an olefin metathesis catalyst wherein:

M is a Group 8 transition metal; generally M is ruthenium or osmium; typically M is ruthenium;

L$^2$ is a neutral electron donor ligand;

n is 0 or 1; typically n is 0;

m is 0, 1 or 2; typically m is 0;

R is unsubstituted hydrocarbyl, substituted hydrocarbyl, unsubstituted heteroatom-containing hydrocarbyl, or substituted heteroatom-containing hydrocarbyl; generally R is unsubstituted C$_1$-C$_{10}$ alkyl, substituted C$_1$-C$_{10}$ alkyl, unsubstituted C$_3$-C$_8$ cycloalkyl, substituted C$_3$-C$_8$ cycloalkyl, unsubstituted C$_5$-C$_{24}$ aryl or substituted C$_5$-C$_{24}$ aryl; typically R is methyl, ethyl, n-propyl, iso-propyl, n-butyl, tert-butyl, or phenyl;

X and Y are independently C, CR$^{3a}$ or N; and only one of X or Y can be C or CR$^{3a}$;

R$^{3a}$ is hydrogen, unsubstituted hydrocarbyl, substituted hydrocarbyl, unsubstituted heteroatom-containing hydrocarbyl, or substituted heteroatom-containing hydrocarbyl;

Q is a two-atom linkage having the structure —[CR$^{11}$R$^{12}$]$_s$—[CR$^{13}$R$^{14}$]$_t$— or —[CR$^{11}$=CR$^{13}$]—;

R$^{11}$, R$^{12}$, R$^{13}$, and R$^{14}$ are independently hydrogen, unsubstituted hydrocarbyl, substituted hydrocarbyl, unsubstituted heteroatom-containing hydrocarbyl, or substituted heteroatom-containing hydrocarbyl;

"s" and "t" are independently 1 or 2;

R$^3$ is unsubstituted hydrocarbyl, substituted hydrocarbyl, unsubstituted heteroatom-containing hydrocarbyl, or substituted heteroatom-containing hydrocarbyl;

R$^4$ is unsubstituted hydrocarbyl, substituted hydrocarbyl, unsubstituted heteroatom-containing hydrocarbyl, or substituted heteroatom-containing hydrocarbyl;

R$^1$ and R$^2$ are independently hydrogen, unsubstituted hydrocarbyl, substituted hydrocarbyl, unsubstituted heteroatom-containing hydrocarbyl, or substituted heteroatom-containing hydrocarbyl; or R$^1$ and R$^2$ are linked together to form an optionally substituted indenylidene;

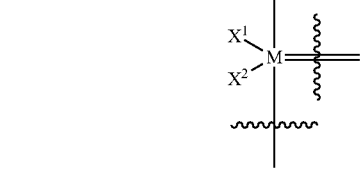

the moiety is

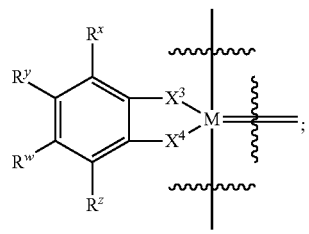

X$^3$ and X$^4$ are independently O or S; and

R$^x$, R$^y$, R$^w$ and R$^z$ are independently hydrogen, halogen, unsubstituted hydrocarbyl, substituted hydrocarbyl, unsubstituted heteroatom-containing hydrocarbyl, or substituted heteroatom-containing hydrocarbyl; generally, R$^x$, R$^y$, R$^w$ and R$^z$ are independently C$_1$-C$_6$ alkyl, hydrogen, halogen, unsubstituted phenyl or substituted phenyl; or R$^x$ and R$^y$ are linked together to form an unsubstituted bicyclic or polycyclic aryl or a substituted bicyclic or polycyclic aryl; or R$^w$ and R$^z$ are linked together to form an unsubstituted bicyclic or polycyclic aryl or a substituted bicyclic or polycyclic aryl; or R$^y$ and R$^w$ are linked together to form an unsubstituted bicyclic or polycyclic aryl or a substituted bicyclic or polycyclic aryl.

In another embodiment of Formula (IV), the invention provides an olefin metathesis catalyst wherein:

M is Ru;

n is 0;

m is 0;

R is unsubstituted hydrocarbyl, substituted hydrocarbyl, unsubstituted heteroatom-containing hydrocarbyl, or substituted heteroatom-containing hydrocarbyl; generally R is unsubstituted C$_1$-C$_{10}$ alkyl, substituted C$_1$-C$_{10}$ alkyl, unsubstituted C$_3$-C$_8$ cycloalkyl, substituted C$_3$-C$_8$ cycloalkyl, unsubstituted C$_5$-C$_{24}$ aryl or substituted C$_5$-C$_{24}$ aryl; typically R is methyl, ethyl, n-propyl, iso-propyl, n-butyl, tert-butyl, or phenyl;

X and Y are each N;

Q is a two-atom linkage having the structure —[CR$^{11}$R$^{12}$]$_s$—[CR$^{13}$R$^{14}$]$_t$—;

R$^{11}$, R$^{12}$, R$^{13}$, and R$^{14}$ are independently C$_1$-C$_6$ alkyl, or hydrogen; generally R$^{11}$ is hydrogen or methyl, R$^{12}$ is hydrogen or methyl, R$^{13}$ is hydrogen and R$^{14}$ is hydrogen; typically R$^{11}$, R$^{12}$, R$^{13}$, and R$^{14}$ are each hydrogen;

"s" and "t" are each 1;

R$^3$ is unsubstituted hydrocarbyl, substituted hydrocarbyl, unsubstituted heteroatom-containing hydrocarbyl, or substituted heteroatom-containing hydrocarbyl;

R$^4$ is unsubstituted hydrocarbyl, substituted hydrocarbyl, unsubstituted heteroatom-containing hydrocarbyl, or substituted heteroatom-containing hydrocarbyl;

R$^1$ is hydrogen and R$^2$ is unsubstituted phenyl, substituted phenyl or substituted 1-propenyl; or R$^1$ and R$^2$ are linked together to form an optionally substituted indenylidene;

the moiety

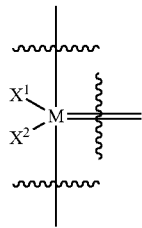

is

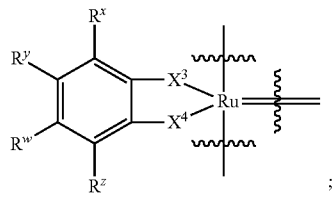

X$^3$ and X$^4$ are each S; and

R$^x$, R$^y$, R$^w$ and R$^z$ are independently C$_1$-C$_6$ alkyl, hydrogen, halogen, unsubstituted phenyl or substituted phenyl; generally R$^x$ is Me, hydrogen or Cl, R$^y$ is hydrogen, R$^w$ is hydrogen, and R$^z$ is Cl, t-Bu, hydrogen or Ph; or R$^x$ and R$^y$ are linked together to form an unsubstituted bicyclic or polycyclic aryl or a substituted bicyclic or polycyclic aryl; or R$^w$ and R$^z$ are linked together to form an unsubstituted bicyclic or polycyclic aryl or a substituted bicyclic or polycyclic aryl; or R$^y$ and R$^w$ are linked together to form an unsubstituted bicyclic or polycyclic aryl or a substituted bicyclic or polycyclic aryl.

Therefore, the olefin metathesis catalyst of Formula (IV), can also be represented by the structure of Formula (VIII):

Formula (VIII)

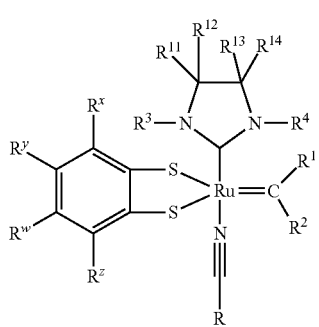

wherein:

R is unsubstituted hydrocarbyl, substituted hydrocarbyl, unsubstituted heteroatom-containing hydrocarbyl, or substituted heteroatom-containing hydrocarbyl; generally R is unsubstituted C$_1$-C$_{10}$ alkyl, substituted C$_1$-C$_{10}$ alkyl, unsubstituted C$_3$-C$_8$ cycloalkyl, substituted C$_3$-C$_8$ cycloalkyl, unsubstituted C$_5$-C$_{24}$ aryl or substituted C$_5$-C$_{24}$ aryl; typically R is methyl, ethyl, n-propyl, iso-propyl, n-butyl, tert-butyl, or phenyl;

R$^3$ is unsubstituted C$_3$-C$_{10}$ cycloalkyl, substituted C$_3$-C$_{10}$ cycloalkyl, unsubstituted C$_5$-C$_{24}$ aryl, C$_5$-C$_{24}$ aryl substituted with up to three substituents selected from: unsubstituted C$_1$-C$_{20}$ alkyl, substituted C$_1$-C$_{20}$ alkyl, unsubstituted C$_1$-C$_{20}$ heteroalkyl, substituted C$_1$-C$_{20}$ heteroalkyl, unsubstituted C$_5$-C$_{24}$ aryl, substituted C$_5$-C$_{24}$ aryl, unsubstituted C$_5$-C$_{24}$ heteroaryl, substituted C$_5$-C$_{24}$ heteroaryl, unsubstituted C$_6$-C$_{24}$ aralkyl, substituted C$_6$-C$_{24}$ aralkyl, unsubstituted C$_6$-C$_{24}$ alkaryl, substituted C$_6$-C$_{24}$ alkaryl and halide; typically, R$^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl or 2-methyl-phenyl;

R$^4$ is unsubstituted C$_3$-C$_{10}$ cycloalkyl, substituted C$_3$-C$_{10}$ cycloalkyl, unsubstituted C$_5$-C$_{24}$ aryl, C$_5$-C$_{24}$ aryl substituted with up to three substituents selected from: unsubstituted C$_1$-C$_{20}$ alkyl, substituted C$_1$-C$_{20}$ alkyl, unsubstituted C$_1$-C$_{20}$ heteroalkyl, substituted C$_1$-C$_{20}$ heteroalkyl, unsubstituted C$_5$-C$_{24}$ aryl, substituted C$_5$-C$_{24}$ aryl, unsubstituted C$_5$-C$_{24}$ heteroaryl, substituted C$_5$-C$_{24}$ heteroaryl, unsubstituted C$_6$-C$_{24}$ aralkyl, substituted C$_6$-C$_{24}$ aralkyl, unsubstituted C$_6$-C$_{24}$ alkaryl, substituted C$_6$-C$_{24}$ alkaryl and halide; typically, R$^4$ is 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl or 2-methyl-phenyl;

R$^1$ is hydrogen and R$^2$ is unsubstituted phenyl, substituted phenyl or substituted 1-propenyl; or R$^1$ and R$^2$ are linked together to form an optionally substituted indenylidene;

R$^{11}$, R$^{12}$, R$^{13}$, and R$^{14}$ are independently C$_1$-C$_6$ alkyl, or hydrogen; generally R$^{11}$ is hydrogen or methyl, R$^{12}$ is hydrogen or methyl, R$^{13}$ is hydrogen and R$^{14}$ is hydrogen; typically R$^{11}$, R$^{12}$, R$^{13}$, and R$^{14}$ are each hydrogen; and R$^x$, R$^y$, R$^w$ and R$^z$ are independently C$_1$-C$_6$ alkyl, hydrogen, halogen, unsubstituted phenyl or substituted phenyl; generally R$^x$ is methyl, hydrogen or Cl, R$^y$ is hydrogen, R$^w$ is hydrogen, and R$^z$ is Cl, t-butyl, hydrogen or phenyl; or R$^x$ and R$^y$ are linked together to form an unsubstituted bicyclic or polycyclic aryl or a substituted bicyclic or polycyclic aryl; or R$^w$ and R$^z$ are linked together to form an unsubstituted bicyclic or polycyclic aryl or a substituted bicyclic or polycyclic aryl; or R$^y$ and R$^w$ are linked together to form an unsubstituted bicyclic or polycyclic aryl or a substituted bicyclic or polycyclic aryl.

In one embodiment, the invention provides an olefin metathesis catalyst represented by the structure of Formula (VIII), wherein:

R is methyl, ethyl, n-propyl, iso-propyl, n-butyl, tert-butyl, or phenyl;

R$^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl- 6-methylphenyl, 2,4,6-trifluorophenyl, 3,5-di-tert-butylphenyl, 2,4-dimethylphenyl, 2,6-difluorophenyl or 2-methyl-phenyl;

$R^4$ is 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl or 2-methyl-phenyl;

$R^1$ is hydrogen and $R^2$ is unsubstituted phenyl, substituted phenyl or substituted 1-propenyl; or $R^1$ and $R^2$ are linked together to form an optionally substituted indenylidene; and $R^x$ is methyl, hydrogen or Cl, $R^y$ is hydrogen, $R^w$ is hydrogen, and $R^z$ is Cl, t-butyl, hydrogen or phenyl; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

Non-limiting examples of olefin metathesis catalysts represented by the structure of Formula (VIII) are described in Table (4), wherein R is methyl, $R^y$ is hydrogen and $R^w$ is hydrogen.

TABLE (4)

| Catalyst | $R^1$ | $R^2$ | $R^3$ | $R^4$ | $R^x$ | $R^z$ |
|---|---|---|---|---|---|---|
| 153 | H | Ph | 2-Me—C$_6$H$_5$ | 2-Me—C$_6$H$_5$ | Cl | Cl |
| 154 | H | Ph | Mes | Mes | Cl | Cl |
| 155 | H | Ph | Mipp | Mipp | Cl | Cl |
| 156 | H | Ph | DIPP | DIPP | Cl | Cl |
| 157 | H | Ph | IPP | IPP | Cl | Cl |
| 158 | H | isobutenyl | 2-Me—C$_6$H$_5$ | 2-Me—C$_6$H$_5$ | Cl | Cl |
| 159 | H | isobutenyl | Mes | Mes | Cl | Cl |
| 160 | H | isobutenyl | Mipp | Mipp | Cl | Cl |
| 161 | H | isobutenyl | DIPP | DIPP | Cl | Cl |
| 162 | H | isobutenyl | IPP | IPP | Cl | Cl |
| 163 | H | 2-isopropoxyphenyl | 2-Me—C$_6$H$_5$ | 2-Me—C$_6$H$_5$ | Cl | Cl |
| 164 | H | 2-isopropoxyphenyl | Mes | Mes | Cl | Cl |
| 165 | H | 2-isopropoxyphenyl | Mipp | Mipp | Cl | Cl |

TABLE (4)-continued
| Catalyst | R¹ | R² | R³ | R⁴ | Rˣ | Rᶻ |
|---|---|---|---|---|---|---|
| 166 | H | 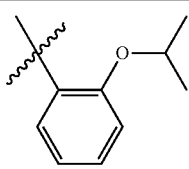 [SMILES: *c1ccccc1OC(C)C] | DIPP | DIPP | Cl | Cl |
| 167 | H | 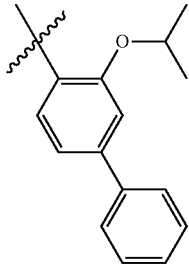 [SMILES: *c1ccc(-c2ccccc2)cc1OC(C)C] | 2-Me—C₆H₅ | 2-Me—C₆H₅ | Cl | Cl |
| 168 | H | 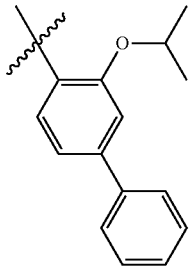 [SMILES: *c1ccc(-c2ccccc2)cc1OC(C)C] | Mes | Mes | Cl | Cl |
| 169 | H | 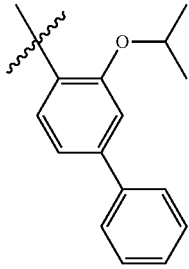 [SMILES: *c1ccc(-c2ccccc2)cc1OC(C)C] | Mipp | Mipp | Cl | Cl |
| 170 | H | 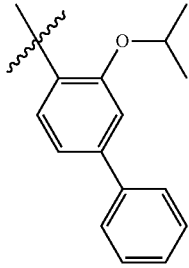 [SMILES: *c1ccc(-c2ccccc2)cc1OC(C)C] | DIPP | DIPP | Cl | Cl |
| 171 | H | 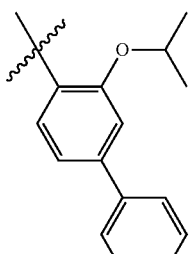 | IPP | IPP | Cl | Cl |

TABLE (4)-continued
| Catalyst | R¹ | R² | R³ | R⁴ | Rˣ | Rᶻ |
|---|---|---|---|---|---|---|
| 172 | H | 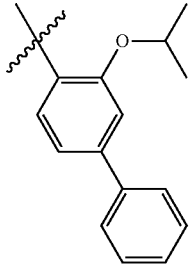 [SMILES: *c1ccc(-c2ccccc2)cc1OC(C)C] | IPP | IPP | Cl | Cl |
| 173 | | 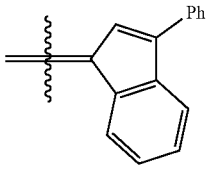 [SMILES: *=C1C=C(c2ccccc2)c2ccccc21] | 2-Me—C₆H₅ | 2-Me—C₆H₅ | Cl | Cl |
| 174 | | 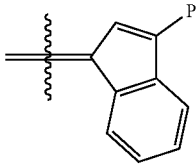 | Mes | Mes | Cl | Cl |
| 175 | | 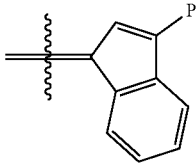 | Mipp | Me | Cl | Cl |
| 176 | | 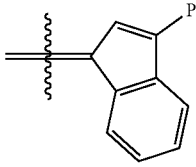 | DIPP | DIPP | Cl | Cl |
| 177 | | 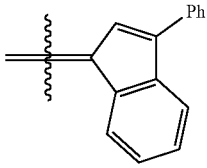 [SMILES: *=C1C=C(c2ccccc2)c2ccccc21] | IPP | Me | Cl | Cl |
| 178 | H | Ph | 2-Me—C₆H₅ | 2-Me—C₆H₅ | H | Ph |
| 179 | H | Ph | Mes | Mes | H | Ph |
| 180 | H | Ph | Mipp | Mipp | H | Ph |
| 181 | H | Ph | DIPP | DIPP | H | Ph |
| 182 | H | Ph | IPP | IPP | H | Ph |
| 183 | H | 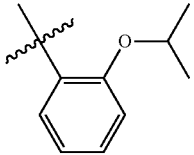 [SMILES: *c1ccccc1OC(C)C] | 2-Me—C₆H₅ | 2-Me—C₆H₅ | H | Ph |

TABLE (4)-continued

| Catalyst | R¹ | R² | R³ | R⁴ | Rˣ | R^z |
|---|---|---|---|---|---|---|
| 184 | H | 2-isopropoxyphenyl | Mes | Mes | H | Ph |
| 185 | H | 2-isopropoxyphenyl | Mipp | Mipp | H | Ph |
| 186 | H | 2-isopropoxyphenyl | DIPP | DIPP | H | Ph |
| 187 | H | 2-isopropoxyphenyl | IPP | IPP | H | Ph |
| 188 | H | 2-methylprop-1-en-1-yl | 2-Me—C₆H₅ | 2-Me—C₆H₅ | H | Ph |
| 189 | H | 2-methylprop-1-en-1-yl | Mes | Mes | H | Ph |
| 190 | H | 2-methylprop-1-en-1-yl | Mipp | Mipp | H | Ph |
| 191 | H | 2-methylprop-1-en-1-yl | DIPP | DIPP | H | Ph |
| 192 | H | 2-methylprop-1-en-1-yl | IPP | IPP | H | Ph |
| 193 | H | 3-Ph-indenylidene | 2-Me—C₆H₅ | 2-Me—C₆H₅ | H | Ph |
| 194 | H | 3-Ph-indenylidene | Mes | Mes | H | Ph |

TABLE (4)-continued

| Catalyst | R¹ | R² | R³ | R⁴ | $R^x$ | $R^z$ |
|---|---|---|---|---|---|---|
| 195 | | 1-Ph-indenylidene | Mipp | Mipp | H | Ph |
| 196 | | 1-Ph-indenylidene | DIPP | DIPP | H | Ph |
| 197 | | 1-Ph-indenylidene | IPP | IPP | H | Ph |
| 198 | H | Ph | 2-Me—$C_6H_5$ | 2-Me—$C_6H_5$ | Me | t-Bu |
| 199 | H | Ph | Mes | Mes | Me | t-Bu |
| 200 | H | Ph | Mipp | Mipp | Me | t-Bu |
| 201 | H | Ph | DIPP | DIPP | Me | t-Bu |
| 202 | H | Ph | IPP | IPP | Me | t-Bu |
| 203 | H | isobutenyl | 2-Me—$C_6H_5$ | 2-Me—$C_6H_5$ | Me | t-Bu |
| 204 | H | isobutenyl | Mes | Mes | Me | t-Bu |
| 205 | H | isobutenyl | Mipp | Mipp | Me | t-Bu |
| 206 | H | isobutenyl | DIPP | DIPP | Me | t-Bu |
| 207 | H | isobutenyl | IPP | IPP | Me | t-Bu |
| 208 | H | 2-isopropoxyphenyl | 2-Me—$C_6H_5$ | 2-Me—$C_6H_5$ | Me | t-Bu |
| 209 | H | 2-isopropoxyphenyl | Mes | Mes | Me | t-Bu |

TABLE (4)-continued
| Catalyst | R¹ | R² | R³ | R⁴ | $R^x$ | $R^z$ |
|---|---|---|---|---|---|---|
| 210 | H | 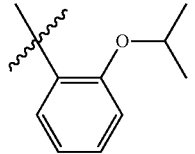 [SMILES: *c1ccccc1OC(C)C] | Mipp | Mipp | Me | t-Bu |
| 211 | H | 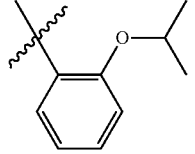 [SMILES: *c1ccccc1OC(C)C] | DIPP | DIPP | Me | t-Bu |
| 212 | H | 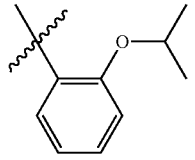 [SMILES: *c1ccccc1OC(C)C] | IPP | IPP | Me | t-Bu |
| 213 | | 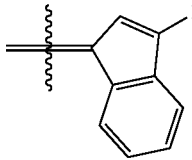 | 2-Me—C₆H₅ | 2-Me—C₆H₅ | Me | t-Bu |
| 214 | | 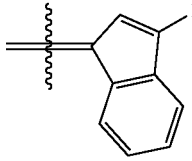 | Mes | Mes | Me | t-Bu |
| 215 | | 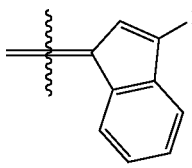 | Mipp | Mipp | Me | t-Bu |
| 216 | | 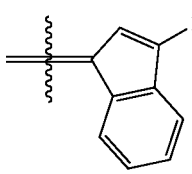 | DIPP | DIPP | Me | t-Bu |
| 217 | | 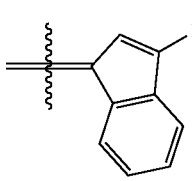 | IPP | IPP | Me | t-Bu |

The present invention also concerns processes for synthesizing the olefin metathesis catalysts of the invention. The olefin metathesis catalysts according to the invention can be prepared analogously to conventional methods as understood by the person skilled in the art of synthetic organic chemistry. For example, synthetic Scheme 1, set forth below, illustrates how the compounds according to the invention can be made.

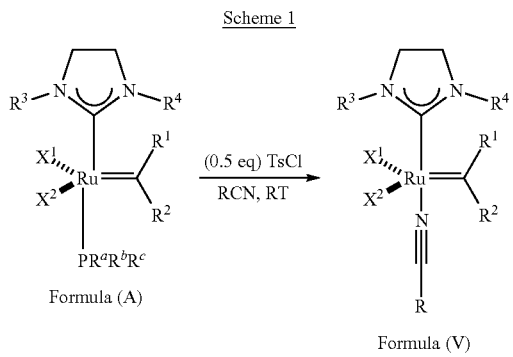

Formula (A)  Formula (V)

In a typical procedure, an olefin metathesis catalyst of general Formula (A) is reacted at room temperature with tosyl chloride (TsCl) and an excess of nitrile derivative (RCN) to produce an olefin metathesis catalyst of general Formula (V), wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is unsubstituted phenyl, substituted phenyl or substituted 1-propenyl; or $R^1$ and $R^2$ are linked together to form an optionally substituted indenylidene; typically $R^2$ is phenyl, 2-iso-propoxy-phenyl, 2-iso-propylphenyl or 2-methyl-1-propenyl; or $R^1$ and $R^2$ are linked together to form 3-phenyl-1-indenylidene;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently halogen, trifluoroacetate, per-fluorophenolate, thiolate, alkylthio, arylthio or nitrate; generally $X^1$ and $X^2$ are independently Cl, Br, I or F; typically $X^1$ and $X^2$ are each Cl;

$R^3$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $R^3$ and $R^4$ are independently unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ and $R^4$ are independently 2,4,6-trimethylphenyl, 2,6-di-iso-propylphenyl, 2-iso-propylphenyl or 2-iso-propyl-6-methyl phenyl; and $R^a$, $R^b$, and $R^c$ are each independently substituted $C_5$-$C_{24}$ aryl, unsubstituted $C_5$-$C_{24}$ aryl or substituted $C_1$-$C_{10}$ alkyl, unsubstituted $C_1$-$C_{10}$ alkyl; generally $R^a$, $R^b$, and $R^c$ are each independently unsubstituted $C_5$-$C_{24}$ aryl; typically $R^a$, $R^b$, and $R^c$ are each phenyl.

In another embodiment, the invention concerns methods of using the olefin metathesis catalysts of the invention, in the synthesis of related olefin metathesis catalysts. The ruthenium olefin metathesis catalysts bearing nitrile labile ligands of the invention are excellent precursors for various Second Generation Grubbs ruthenium olefin metathesis catalysts. The Second Generation Grubbs ruthenium olefin metathesis catalysts synthesized during these procedures are obtained in higher yield and with higher purity, which presents an advantage compared to the existing synthetic procedures.

In another embodiment, the invention concerns also processes for synthesizing olefin metathesis catalysts of Formula (F) starting with an olefin metathesis catalyst of Formula (IV).

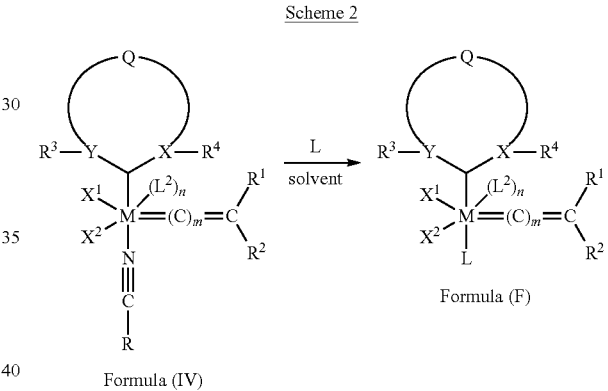

Formula (IV)  Formula (F)

In a typical procedure as shown in Scheme 2, the nitrile ligand of the olefin metathesis catalyst represented by Formula (IV) can be exchanged with a "L" ligand, which is a neutral electron donor. "L" is selected from the group consisting of sulphonated phosphine, phosphite, phosphinite, phosphonite, ether, amine, carbonyl, nitrosyl, pyridine, thioether, Grubbs-Hoveyda ligands, trimethylphosphine (PMe₃), triethylphosphine (PEt₃), tri-n-butylphosphine (PBu₃), tri(ortho-tolyl)phosphine (P-o-tolyl₃), tri-tert-butylphosphine (P-tert-Bu₃), tricyclopentylphosphine (PCp₃), tricyclohexylphosphine (PCy₃), triisopropylphosphine (P-i-Pr₃), trioctylphosphine (POct₃), tri-iso-butylphosphine, (P(i-Bu)₃), triphenylphosphine (PPh₃), tri(pentafluorophenyl)phosphine (P(C₆F₅)₃), methyldiphenylphosphine (PMePh₂), dimethylphenylphosphine (PMe₂Ph), diethylphenylphosphine (PEt₂Ph), phosphabicycloalkane (e.g., monosubstituted 9-phosphabicyclo[3.3.1]nonane, monosubstituted 9-phosphabicyclo[4.2.1]nonane], cyclohexylphoban, isopropylphoban, ethylphoban, methylphoban, butylphoban, pentylphoban), pyridine, 3-bromopyridine, 4-bromopyridine, 3,5-dibromopyridine, 2,4,6-tribromopyridine, 2,6-dibromopyridine, 3-chloropyridine, 4-chloropyridine, 3,5-dichloropyridine, 2,4,6-trichloropyridine, 2,6-dichloropyridine, 4-iodopyridine, 3,5-diiodopyridine, 3,5-dibromo-4-methylpyridine, 3,5- dichloro-4-methylpyridine, 3,5-dimethyl-4-bromopyridine, 3,5-dimethylpyridine, 4-methylpyridine, 3,5-di-iso-propylpyridine, 2,4,6-trimethylpyridine, 2,4,6-triisopropylpyridine, 4-(tert-butyl)pyridine, 4-phenylpyridine, 3,5-diphenylpyridine, 3,5-dichloro-4-phenylpyridine, bipyridine, pyridazine, pyrimidine, bipyridamine, pyrazine, 1,3,5-triazine, 1,2,4-triazine, 1,2,3-triazine, pyrrole, 2H-pyrrole, 3H-pyrrole, pyrazole, 2H-imidazole, 1,2,3-triazole, 1,2,4-triazole, indole, 3H-indole, 1H-isoindole, cyclopenta(b)pyridine, indazole, quinoline, bisquinoline, isoquinoline, bisisoquinoline, cinnoline, quinazoline, naphthyridine, piperidine, piperazine, pyrrolidine, pyrazolidine, quinuclidine, imidazolidine, picolylimine, purine, benzimidazole, bisimidazole, phenazine, acridine, carbazole, sulfur-containing heterocycles (e.g., thiophene, 1,2-dithiole, 1,3-dithiole, thiepin, benzo(b)thiophene, benzo(c)thiophene, thionaphthene, dibenzothiophene, 2H-thiopyran, 4H-thiopyran, thioanthrene), oxygen-containing heterocycles (e.g., 2H-pyran, 4H-pyran, 2-pyrone, 4-pyrone, 1,2-dioxin, 1,3-dioxin, oxepin, furan, 2H-1-benzopyran, coumarin, coumarone, chromene, chroman-4-one, isochromen-1-one, isochromen-3-one, xanthene, tetrahydrofuran, 1,4-dioxan, dibenzofuran), mixed (e.g., isoxazole, oxazole, thiazole, isothiazole, 1,2,3-oxadiazole, 1,2,4-oxadiazole, 1,3,4-oxadiazole, 1,2,3, 4-oxatriazole, 1,2,3,5-oxatriazole, 3H-1,2,3-dioxazole, 3H-1,2-oxathiole, 1,3-oxathiole, 4H-1,2-oxazine, 2H-1,3-oxazine, 1,4-oxazine, 1,2,5-oxathiazine, o-isooxazine, phenoxazine, phenothiazine, pyrano[3,4-b]pyrrole, indoxazine, benzoxazole, anthranil, and morpholine), and aromatic nitrogen-containing and oxygen-containing heterocycles, monocyclic N-heteroaryl ligands that are optionally substituted with 1 to 3, preferably 1 or 2, substituents.

The ligand exchange reactions are carried out under inert atmosphere (under nitrogen or argon). The reactions generally are carried out at room temperature or at temperatures from 15° C. to 25° C., or from 25° C. to 60° C., or from 35° C. to 50° C., or from 20° C. to 25° C., or from 30° C. to 40° C., or from 25° C. to 45° C. The reaction times vary from several minutes to several hours 12 hours, 24 hours or 48 hours. Generally the reactions take place in solvents such as tetrahydrofuran (THF), benzene, toluene, xylene, diethyl ether, dioxane, alcohols, methyl-tetrahydrofuran, acetone, ethyl acetate, methyl tert-butyl ether (MTBE), dimethylformamide (DMF), and dichloromethane.

In one embodiment, the invention concerns also processes for synthesizing olefin metathesis catalysts of Formula (B) starting with an olefin metathesis catalyst of Formula (V).

Scheme 3

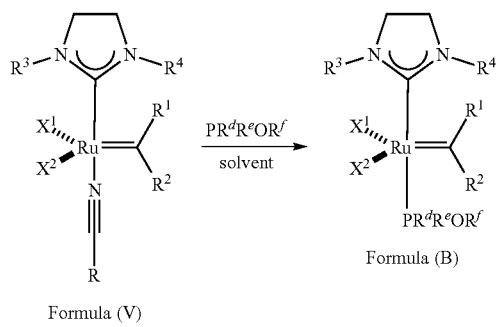

Formula (V)

In a typical procedure, as shown in Scheme 3, the nitrile ligand of the olefin metathesis catalyst represented by Formula (V) is exchanged with a $PR^dR^eOR^f$ ligand at room temperature in an inert solvent, such as dichloromethane or toluene, wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is unsubstituted phenyl, substituted phenyl or substituted 1-propenyl; or $R^1$ and $R^2$ are linked together to form an optionally substituted indenylidene; typically $R^2$ is phenyl, 2-iso-propoxy-phenyl, 2-iso-propylphenyl or 2-methyl-1-propenyl; or $R^1$ and $R^2$ are linked together to form 3-phenyl-1-indenylidene;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently halogen, trifluoroacetate, per-fluorophenolate, thiolate, alkylthio, arylthio or nitrate; generally $X^1$ and $X^2$ are independently Cl, Br, I or F; typically $X^1$ and $X^2$ are each Cl;

$R^3$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $R^3$ and $R^4$ are independently unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ and $R^4$ are independently 2,4,6-trimethylphenyl, 2,6-di-iso-propylphenyl, 2-iso-propyl-phenyl or 2-iso-propyl-6-methyl phenyl;

$R^d$ is unsubstituted $C_1$-$C_{10}$ alkyl, substituted $C_1$-$C_{10}$ alkyl, unsubstituted $C_6$-$C_{10}$ aryl, substituted $C_6$-$C_{10}$ aryl, unsubstituted $C_3$-$C_8$ cycloalkyl or substituted $C_3$-$C_8$ cycloalkyl; generally $R^d$ is unsubstituted $C_1$-$C_{10}$ alkyl or unsubstituted $C_6$-$C_{10}$ aryl; typically $R^d$ is phenyl;

$R^e$ is unsubstituted $C_1$-$C_{10}$ alkyl, substituted $C_1$-$C_{10}$ alkyl, unsubstituted $C_6$-$C_{10}$ aryl, substituted $C_6$-$C_{10}$ aryl, unsubstituted $C_3$-$C_8$ cycloalkyl or substituted $C_3$-$C_8$ cycloalkyl; generally $R^e$ is unsubstituted $C_1$-$C_{10}$ alkyl or unsubstituted $C_6$-$C_{10}$ aryl; typically $R^e$ is phenyl; and R is unsubstituted $C_1$-$C_{10}$ alkyl, substituted $C_1$-$C_{10}$ alkyl, unsubstituted $C_6$-$C_{10}$ aryl, substituted $C_6$-$C_{10}$ aryl, unsubstituted $C_3$-$C_8$ cycloalkyl or substituted $C_3$-$C_8$ cycloalkyl; generally $R^f$ is unsubstituted $C_1$-$C_{10}$ alkyl, unsubstituted $C_6$-$C_{10}$ aryl or unsubstituted $C_6$-$C_{10}$ aryl; typically $R^f$ is phenyl, methyl or p-(OMe)phenyl.

In another embodiment, the invention concerns also processes for synthesizing olefin metathesis catalysts of Formula (C) starting with an olefin metathesis catalyst of Formula (V).

Scheme 4

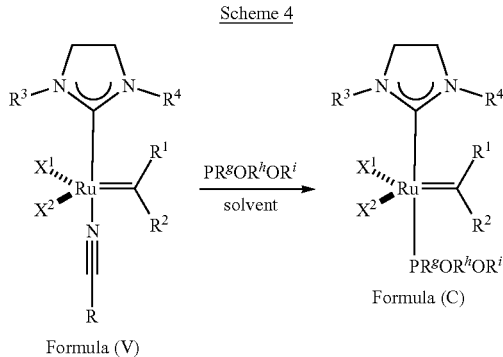

Formula (V) → Formula (C)

In a typical procedure as shown in Scheme 4, the nitrile ligand of the olefin metathesis catalyst represented by Formula (V) can be exchanged with a $PR^gOR^hOR^i$ ligand at room temperature in an inert solvent, such as dichloromethane or toluene, wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is phenyl, substituted phenyl or substituted 1-propenyl; or $R^1$ and $R^2$ are linked together to form an optionally substituted indenylidene; typically $R^2$ is phenyl, 2-iso-propoxy-phenyl, 2-iso-propylphenyl or 2-methyl-1-propenyl; or $R^1$ and $R^2$ are linked together to form 3-phenyl-1-indenylidene;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently halogen, trifluoroacetate, per-fluorophenolate, thiolate, alkylthio, arylthio or nitrate; generally $X^1$ and $X^2$ are independently Cl, Br, I or F; typically $X^1$ and $X^2$ are each Cl;

$R^3$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $R^3$ and $R^4$ are independently unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ and $R^4$ are independently 2,4,6-trimethylphenyl, 2,6-di-iso-propylphenyl, 2-iso-propyl-phenyl or 2-iso-propyl-6-methyl phenyl;

$R^g$ is unsubstituted $C_1$-$C_{10}$ alkyl, substituted $C_1$-$C_{10}$ alkyl, unsubstituted $C_6$-$C_{10}$ aryl, substituted $C_6$-$C_{10}$ aryl, unsubstituted $C_3$-$C_8$ cycloalkyl or substituted $C_3$-$C_8$ cycloalkyl; generally $R^g$ is unsubstituted $C_1$-$C_{10}$ alkyl or unsubstituted $C_6$-$C_{10}$ aryl; typically $R^g$ is phenyl;

$R^h$ is unsubstituted $C_1$-$C_{10}$ alkyl, substituted $C_1$-$C_{10}$ alkyl, unsubstituted $C_6$-$C_{10}$ aryl, substituted $C_6$-$C_{10}$ aryl, unsubstituted $C_3$-$C_8$ cycloalkyl or substituted $C_3$-$C_8$ cycloalkyl; generally $R^h$ is unsubstituted $C_1$-$C_{10}$ alkyl or unsubstituted $C_6$-$C_{10}$ aryl; typically $R^h$ is phenyl or methyl; and $R^i$ is unsubstituted $C_1$-$C_{10}$ alkyl, substituted $C_1$-$C_{10}$ alkyl, unsubstituted $C_6$-$C_{10}$ aryl, substituted $C_6$-$C_{10}$ aryl, unsubstituted $C_3$-$C_8$ cycloalkyl or substituted $C_3$-$C_8$ cycloalkyl; generally $R^i$ is unsubstituted $C_1$-$C_{10}$ alkyl or unsubstituted $C_6$-$C_{10}$ aryl; typically $R^i$ is phenyl or methyl.

In another embodiment, the invention concerns also processes for synthesizing olefin metathesis catalysts of Formula (D) starting with an olefin metathesis catalyst of Formula (V).

Scheme 5

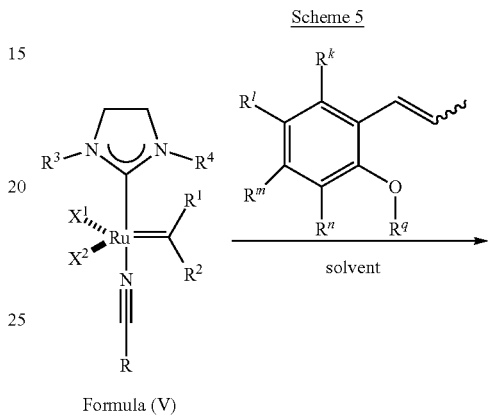

Formula (V)

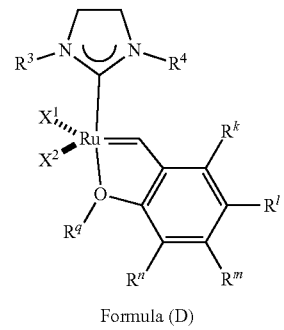

Formula (D)

In a typical procedure as shown in Scheme 5, the acetonitrile ligand of the olefin metathesis catalyst represented by Formula (V) is exchanged with a ligand at 60° C. in ethyl acetate, wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is phenyl, substituted phenyl or substituted 1-propenyl; or $R^1$ and $R^2$ are linked together to form an optionally substituted indenylidene; typically $R^2$ is phenyl, 2-iso-propylphenyl or 2-methyl-1-propenyl; or $R^1$ and $R^2$ are linked together to form 3-phenyl-1-indenylidene;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently halogen, trifluoroacetate, per-fluorophenolate, thiolate, alkylthio, arylthio or nitrate; generally $X^1$ and $X^2$ are independently Cl, Br, I or F; typically $X^1$ and $X^2$ are each Cl;

$R^3$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $R^3$ and $R^4$ are independently unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ and $R^4$ are independently 2,4,6-trimethylphenyl, 2,6-di-iso-propylphenyl, 2-iso-propyl-phenyl or 2-iso-propyl-6-methyl phenyl;

$R^k$ is hydrogen, halogen, —$NO_2$, —CN, —$CF_3$, —$SO_2NR_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl; typically $R^k$ is hydrogen;

$R^l$ is hydrogen, halogen, —$NO_2$, —CN, —$CF_3$, —$SO_2NR_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl; typically $R^l$ is hydrogen;

$R^m$ is hydrogen, halogen, —$NO_2$, —CN, —$CF_3$, —$SO_2NR_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl; typically $R^m$ is hydrogen, —$NO_2$, —CN, —$CF_3$, —$SO_2NR_2$, —NHC(O)$CF_3$, —NHC(O)$C_6F_5$, or —NHC(O)OtBu; specifically $R^m$ is hydrogen;

$R^n$ is hydrogen, halogen, —$NO_2$, —CN, —$CF_3$, —$SO_2NR_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl; typically $R^n$ is hydrogen;

$R^s$ is hydrogen or $C_1$-$C_6$ alkyl; typically $R^s$ is hydrogen, methyl, ethyl or n-propyl; and $R^q$ is unsubstituted hydrocarbyl, substituted hydrocarbyl; generally $R^q$ is $C_1$-$C_{10}$ alkyl; typically $R^q$ is iso-propyl.

In another embodiment, the invention concerns also processes for synthesizing olefin metathesis catalysts of Formula (E) starting with an olefin metathesis catalyst of Formula (V).

Scheme 6

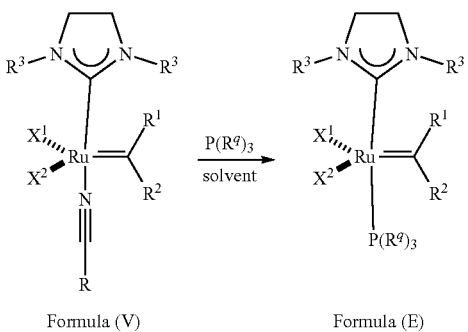

Formula (V)    Formula (E)

In a typical procedure as shown in Scheme 6, the nitrile ligand of the olefin metathesis catalyst represented by Formula (V) can be exchanged with a P($R^q$)$_3$ ligand at room temperature in an inert solvent, such as dichloromethane; wherein:

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; generally $R^2$ is phenyl, substituted phenyl or substituted 1-propenyl; or $R^1$ and $R^2$ are linked together to form an optionally substituted indenylidene; typically $R^2$ is phenyl, 2-iso-propylphenyl or 2-methyl-1-propenyl; or $R^1$ and $R^2$ are linked together to form 3-phenyl-1-indenylidene;

R is unsubstituted hydrocarbyl, substituted hydrocarbyl, unsubstituted heteroatom-containing hydrocarbyl, or substituted heteroatom-containing hydrocarbyl; generally R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl; typically R is methyl, ethyl, n-propyl, iso-propyl, n-butyl, tert-butyl, or phenyl;

$X^1$ and $X^2$ are independently halogen, trifluoroacetate, per-fluorophenolate, thiolate, alkylthio, arylthio or nitrate; generally $X^1$ and $X^2$ are independently Cl, Br, I or F; typically $X^1$ and $X^2$ are each Cl;

$R^3$ and $R^4$ are independently hydrogen, unsubstituted hydrocarbyl, substituted hydrocarbyl, unsubstituted heteroatom-containing hydrocarbyl, or substituted heteroatom-containing hydrocarbyl; generally, $R^3$ and $R^4$ are independently unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; typically, $R^3$ and $R^4$ are independently 2,4,6-trimethylphenyl, 2,6-di-iso-propylphenyl, 2-iso-propyl-phenyl or 2-iso-propyl-6-methyl phenyl; and $R^q$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; generally $R^q$ is substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; typically $R^q$ is phenyl, cyclohexyl, or cyclopentyl.

At this stage, those skilled in the art will appreciate that many additional compounds that fall under the scope of the invention can be prepared by performing various common chemical reactions. Details of certain specific chemical transformations are provided in the examples.

The metal carbene olefin metathesis catalysts can be utilized in olefin metathesis reactions according to techniques known in the art. For example, the metal carbene olefin metathesis catalysts are typically added to a resin composition as a solid, a solution, or as a suspension. When the metal carbene olefin metathesis catalysts are added to a resin composition as a suspension, the metal carbene olefin metathesis catalysts are suspended in a dispersing carrier such as mineral oil, paraffin oil, soybean oil, tri-iso-propylbenzene, or any hydrophobic liquid which has a sufficiently high viscosity so as to permit effective dispersion of the catalyst(s), and which is sufficiently inert and which has a sufficiently high boiling point so that is does not act as a low-boiling impurity in the olefin metathesis reaction. It will be appreciated that the amount of catalyst that is used (i.e., the "catalyst loading") in the reaction is dependent upon a variety of factors such as the identity of the reactants and the reaction conditions that are employed. It is therefore understood that catalyst loading can be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of an olefinic substrate (e.g., cyclic olefins).

Cyclic Olefins

Resin compositions that may be used with the present invention disclosed herein comprise one or more cyclic olefins. Such cyclic olefins may be optionally substituted, optionally heteroatom-containing, mono-unsaturated, di-unsaturated, or poly-unsaturated $C_5$ to $C_{24}$ hydrocarbons that may be mono-, di-, or poly-cyclic. The cyclic olefin may generally be any strained or unstrained cyclic olefin, provided the cyclic olefin is able to participate in a ROMP reaction either individually or as part of a ROMP cyclic olefin composition.

Examples of bicyclic and polycyclic olefins thus include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; $C_2$-$C_2$ hydrocarbyl substituted norbornenes; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; 5-butenyl-2-norbornene; 5-tolyl-norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; bicyclo[2.2.1]hept-2-ene-2-carboxylic acid, 2-ethylhexyl ester; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxy carbonylnorbornene; endo,endo-5,6-dimethoxycarbonylnorbornene; 2,3-dimethoxynorbornene; norbornadiene; tricycloundecene; tetracyclododecene; 8-methyl tetracyclododecene; 8-ethyltetracyclododecene; 8-methoxy carbonyltetracyclo dodecene; 8-methyl-8-tetra cyclododecene; 8-cyanotetracyclo dodecene; pentacyclopentadecene; pentacyclo hexadecene; bicyclo[2.2.1]hept-2-ene-5-phenoxymethyl; 2-ethylhexyl ester-bicyclo[2.2.1]hept-5-ene-2-carboxylic acid; 2-hydroxyethyl ester-bicyclo[2.2.1]hept-5-ene-2-carboxylic acid; bicyclo[2.2.1]hept-5-ene-2-methanol; bicyclo[2.2.1]hept-5-ene-2-heptanoic acid-methyl ester; bicyclo[2.2.1]hept-5-ene-2-hexanoic acid-methyl ester; 1,4:5,8-dimethanonaphthalene, 2-hexyl-1,2,3,4,4a,5,8, 8a-octahydro; bicyclo[2.2.1]hept-5-ene-2-octanoic acid-methyl ester; 1,4:5,8-dimethano naphthalene; 2-butyl-1,2,3,4,4a,5,8,8a-octahydro; ethylidenetetracyclododecene; 2-vinyl-1,2,3,4,4a,5,8,8a-octahydro-1,4:5,8-dimethano naphthalene; and the like, and their structural isomers, stereoisomers, and mixtures thereof.

EXPERIMENTAL

General Information—Materials and Methods

In the following examples, efforts have been made to ensure accuracy with respect to numbers used (e.g., amounts, temperature, etc.) but some experimental error and deviation should be accounted for. The examples are to be considered as not being limiting of the invention described herein.

All reactions involving metal complexes were conducted in oven-dried glassware under an argon or nitrogen atmosphere using standard Schlenk techniques. Chemicals and solvents were obtained from Sigma-Aldrich, Strem, Alfa Aesar, Nexeo, Brenntag, AG Layne and TCI. Commercially available reagents were used as received unless otherwise noted. Silica gel was purchased from Fisher (0.040-0.063 μm, EMD Millipore).

Catalysts C931 and C848 were prepared using known methods.

$^1$H and $^{13}$C NMR spectra were recorded on a Varian 400 MHz spectrometer. Chemical shifts are reported in ppm downfield from Me$_4$Si by using the residual solvent peak as an internal standard (CDCl$_3$ δ 7.24 ppm; CD$_2$Cl$_2$ δ 5.32 ppm). $^{31}$P NMR used an external standard of 85% H$_3$PO$_4$, referenced to 0 ppm. Spectra were analyzed and processed using MestReNova software.

The GC analyses were run using a flame ionization detector. The Column used is: HP-5 from J&W, 30 m-0.25 mm i.d.-0.25 m film thickness. GC method conditions: injection temperature, 250° C.; detector temperature, 280° C.; oven temperature, starting temperature, 100° C.; hold time, 1 min. The ramp rate was 10° C./min to 250° C., hold time 12 min; carrier gas helium.

The following abbreviations are used in the examples:

mL milliliter

CD$_2$Cl$_2$ deuterated dichloromethane

DCM dichloromethane

C$_6$D$_6$ deuterated benzene

Et$_2$O diethylether

CDCl$_3$ deuterated chloroform

C931

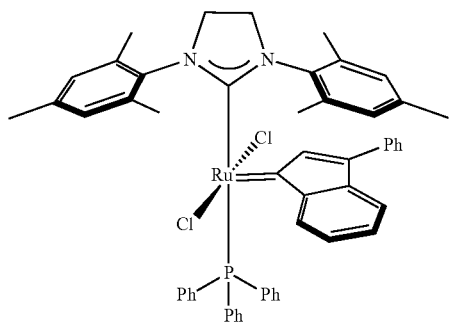

[1,3-bis-(2,4,6-trimethylphenyl)-2-imidazolidinylidene]dichloro (phenylindenylidene)(triphenylphosphine)ruthenium (II) [CAS 340810-50-6]
C848

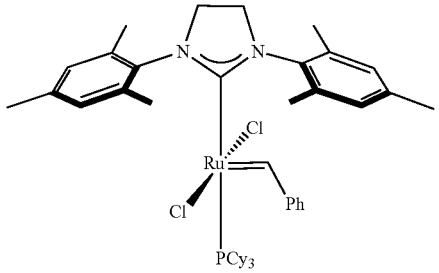

Dichloro[1,3-bis(2,4,6-trimethylphenyl)-2-imidazolidinylidene](benzylidene)(tricyclohexylphosphine) ruthenium (II) [CAS 246047-72-3]
MeCN acetonitrile
CuCl cooper (I) chloride
MTBE methyl-tert-butyl ether
$PCy_3$ tricyclohexylphosphine
EtOAc ethyl acetate
THMP/IPA tris(hydroxymethyl)phosphine/isopropanol

EXAMPLES

Example 1

Synthesis of C710

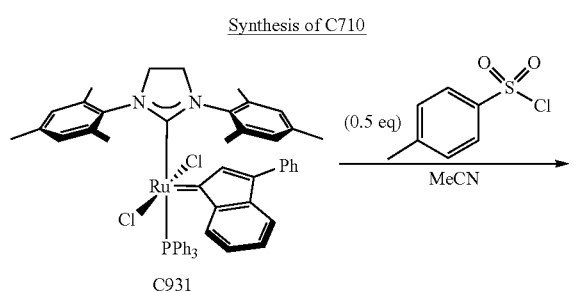

To a 250 mL round bottom flask equipped with a magnetic stir bar was added C931 (20.0 g, 21.48 mmol), acetonitrile (100 mL), and tosyl chloride (2.05 g, 10.74 mmol). The resulting reaction was allowed to stir for 60 minutes at ambient temperature then devolatilized. The resulting residue was recrystallized from MeCN/MTBE at ambient temperature. The red/brown crystals were isolated by filtration and washed with MeCN/MTBE (1:9, 2×25 mL) followed by MTBE (20 mL) then dried in vacuum to afford C710 (14.49 g, 95% yield).

$^1$H NMR (400 MHz, $CD_2Cl_2$) δ 8.65 (d, J=6.4 Hz, 1H), 7.72-7.68 (m, 2H), 7.55-7.44 (m, 3H), 7.28-7.23 (m, 3H), 7.19-7.04 (m, 2H), 6.53-6.07 (m, 3H), 4.19-3.94 (m, 4H), 2.67-1.73 (m, 21H).

Example 2

Synthesis of C651

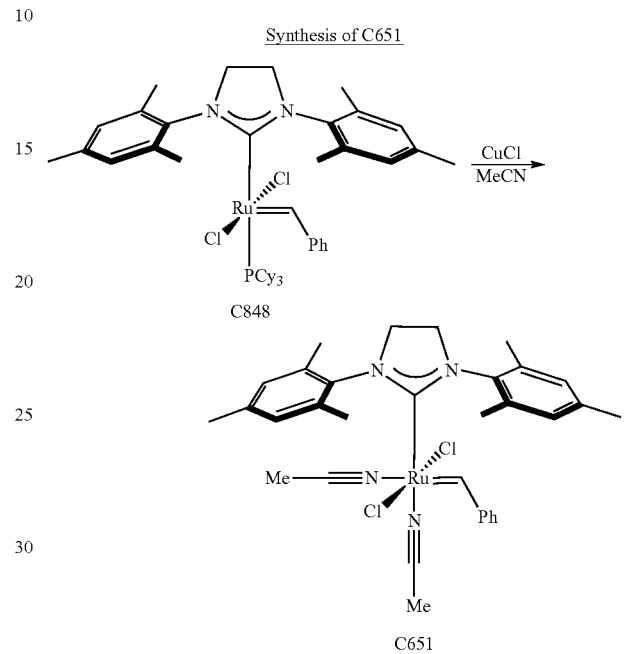

To a MeCN suspension (10 mL) of C848 (200 mg, 0.236 mmol) was added solid CuCl (46.6 mg, 0.471 mmol) in one portion. The mixture was allowed to stir at ambient temperature for 3 h, during which the solution slowly turned dark green/brown. All volatiles were removed under reduced pressure, and 10 mL of DCM were added. The mixture was passed through a short plug of Celite to remove the unwanted solid. The solvent was then removed under reduced pressure to afford a purple/brown solid of C651 which was washed with $Et_2O$, and dried under vacuum (145 mg, 95%).

$^1$H NMR (300 MHz; $CD_2Cl_2$): 616.66 (s, 1H), 7.63 (t, 1H, 7.9 Hz), 7.34-7.22 (m, 4H), 7.06 (s, 4H), 4.21 (s, 4H), 2.48 (s, 6H), 2.42 (s, 6H), 2.30 (s, 12H).

Example 3

Synthesis of C848$_{ss}$

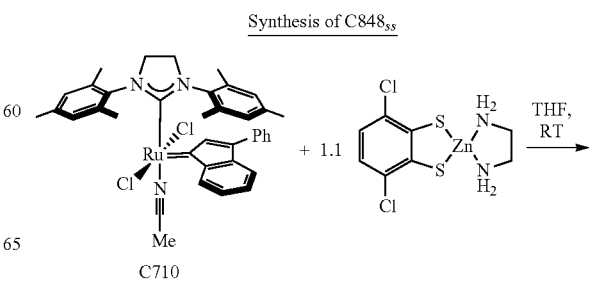

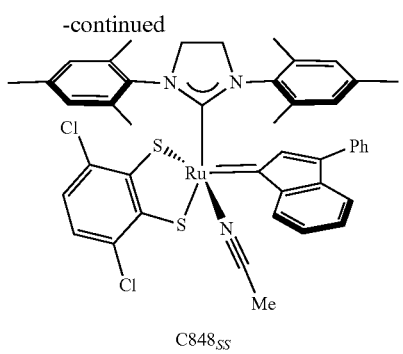

C848$_{SS}$

To a 40 mL scintillation vial equipped with a magnetic stir bar was added C710 (0.500 g, 0.705 mmol), (3,6-dichlorobenzene-1,2-dithiolato)(ethylenediamine)zinc(II) (0.259 g, 0.775 mmol), and tetrahydrofuran (5 mL). The reaction was stirred at ambient temperature for one hour then concentrated to dryness. The resulting residue was extracted with dichloromethane (20 mL), passed through a 0.2 μm syringe filter, and then concentrated in vacuum to ca. 5 mL. Diethyl ether (35 mL) was added slowly affording a black microcrystalline precipitate. The product was isolated by filtration, washed with diethyl ether (2×4 mL) and dried in vacuum to afford C848$_{ss}$ (0.451 g, 75.4% yield).

$^1$H NMR (400 MHz, CD$_2$Cl$_2$) δ 7.84 (d, J=5.8 Hz, 1H), 7.71 (br s, 2H), 7.46 (br s, 3H), 7.16-6.78 (m, 7H), 6.63 (br s, 3H), 4.00 (s, 4H), 2.53 (br s, 6H), 2.39 (s, 3H), 2.27 (br s, 6H), 2.06 (br s, 6H).

Synthesis of Second Generation Grubbs Ruthenium Olefin Metathesis Catalysts

Example 4

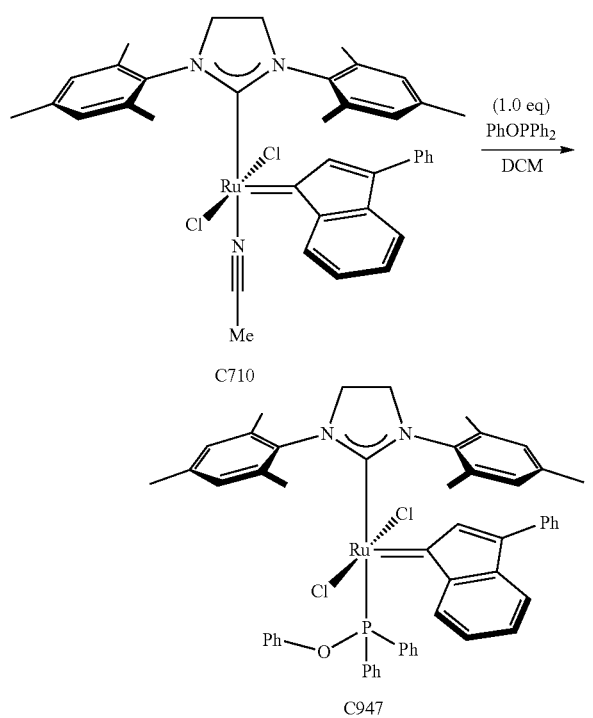

To a 250 mL round bottom flask equipped with a magnetic stir bar was added C710 (7.19 g, 10.12 mmol), dichloromethane (38 mL), and P(PhO)(Ph)$_2$ ([CAS 13360-92-4] 2.84 g, 10.20 mmol). The resulting reaction was allowed to stir for 15 minutes at ambient temperature then devolatilized. The resulting residue was triturated with hexanes (100 mL) at ambient temperature. The red/brown powder was isolated by filtration and washed with hexanes (50 mL) then dried in vacuum to afford C947 (9.66 g, 93% yield). The $^1$H NMR data correspond to the data found in the literature.

Example 5

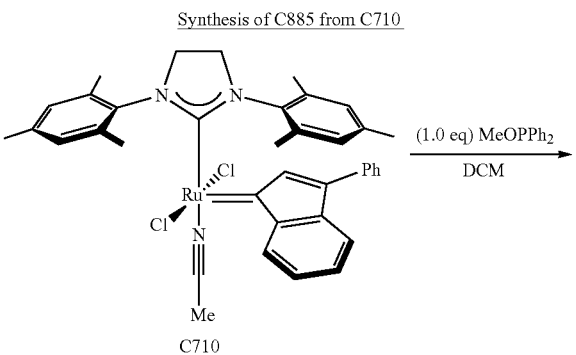

Synthesis of C885 from C710

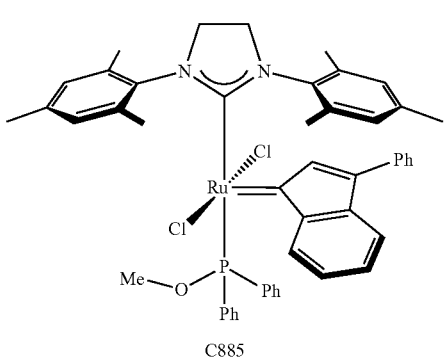

C885

To a 20 mL scintillation vial equipped with a magnetic stir bar was added C710 (0.5 g, 0.70 mmol), dichloromethane (10 mL), and P(MeO)(Ph)$_2$ ([CAS 4020-99-9] 0.16 g, 0.74 mmol). The resulting reaction was allowed to stir for 15 minutes at ambient temperature then devolatilized. The resulting residue was triturated with hexanes (10 mL) at ambient temperature. The red/brown powder was isolated by filtration and washed with hexanes (10 mL) then dried in vacuum to afford C885 (0.59 g, 95% yield). The $^1$H NMR data correspond to the data found in the literature.

Example 6

Synthesis of C977 from C710

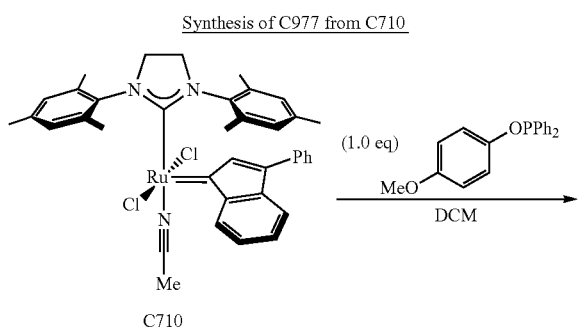

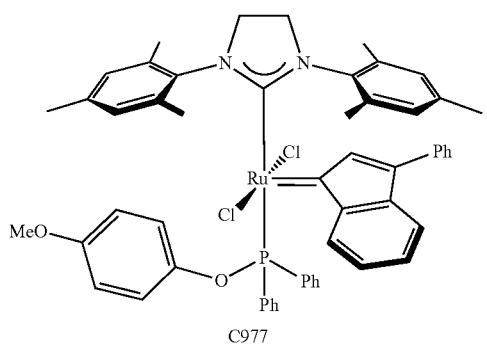

To a 250 mL round bottom flask equipped with a magnetic stir bar was added C710 (5.0 g, 7.04 mmol), dichloromethane (100 mL), and P(OPh-pOMe)(Ph)₂ ([CAS 1346671-90-6] 2.34 g, 7.59 mmol). The resulting reaction was allowed to stir for 15 minutes at ambient temperature then devolatilized. The resulting residue was triturated with hexanes (100 mL) at ambient temperature. The red/brown powder was isolated by filtration and washed with hexanes (50 mL) then dried in vacuum to afford C977 (6.6 g, 96% yield). The $^1$H NMR data correspond to the data found in the literature.

Example 7

Synthesis of C949 from C710

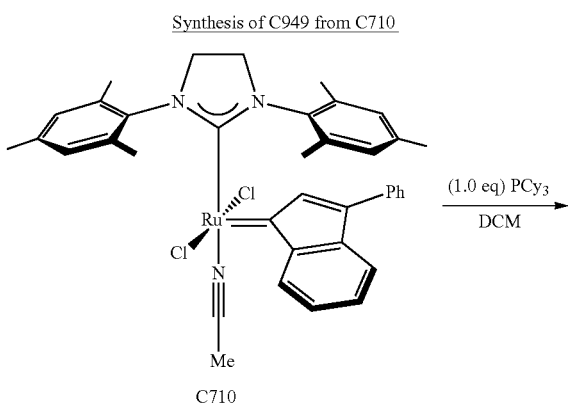

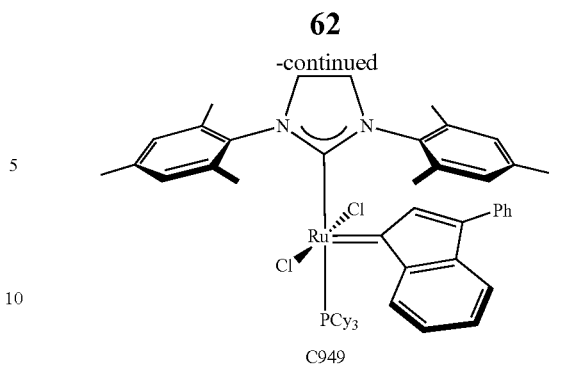

To a 20 mL scintillation vial equipped with a magnetic stir bar was added C710 (0.5 g, 0.70 mmol), dichloromethane (10 mL), and PCy₃ (0.2 g, 0.71 mmol). The resulting reaction was allowed to stir for 15 minutes at ambient temperature then devolatilized. The resulting residue was triturated with hexanes (10 mL) at ambient temperature. The red/brown powder was isolated by filtration and washed with hexanes (10 mL) then dried in vacuum to afford C949 (0.65 g, 98% yield). The $^1$H NMR data correspond to the data found in the literature.

Example 8

Synthesis of C834 from C710

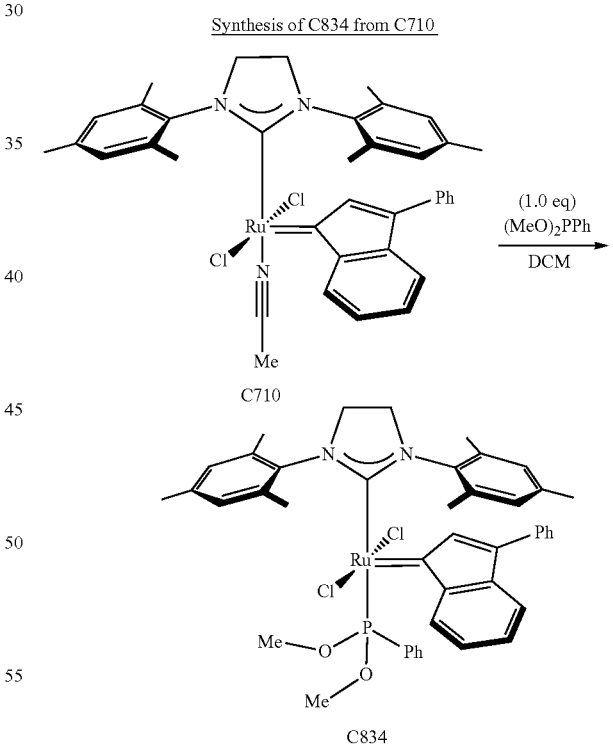

To a 20 mL scintillation vial equipped with a magnetic stir bar was added C710 (0.5 g, 0.70 mmol), dichloromethane (10 mL), and P(Ph)(OMe)₂ ([CAS 2946-61-4] 0.12 g, 0.73 mmol). The resulting reaction was allowed to stir for 15 minutes at ambient temperature then devolatilized. The resulting residue was triturated with hexanes (10 mL) at ambient temperature. The red/brown powder was isolated by filtration and washed with hexanes (10 mL) then dried in vacuum to afford C834 (0.54 g, 92% yield). The $^1$H NMR data correspond to the data found in the literature.

Example 9

Synthesis of C627 form C710

C710

C627

To a 20 mL scintillation vial equipped with a magnetic stir bar was added C710 (0.5 g, 0.70 mmol), ethyl acetate (10 mL), and 2-iso-propoxy-β-methylstyrene (0.18 g, 1.02 mmol). The resulting reaction was allowed to stir for 30 minutes at 60° C. temperature then devolatilized. The resulting residue was triturated with methanol (10 mL) at ambient temperature. The green crystalline material was isolated by filtration and washed with methanol (10 mL) then dried in vacuum to afford C627 (0.37 g, 85% yield). The $^1$H NMR data correspond to the data found in the literature.

Catalytic Activity of the Olefin Metathesis Catalysts of the Invention

The catalytic activity of the complexes according to the invention, was evaluated in metathesis reactions as follows.

Example 10

Ethenolysis of methyl oleate in the presence of C710 methyl oleate (1)

1-decene (2)

methyl 9-decenoate (3)

dimethyl 9-octadecene-1, 18-dioate (4)

9-octadecene (5)

The ethenolysis reaction was carried out using research grade methyl oleate (>99%) that was purified by storage over activated alumina followed by filtration. The reaction was set up in a glovebox under an atmosphere of argon. Methyl oleate (5.0 g; 6.8 mmol) and a C710 catalyst solution (19.2 µL; 0.035 M; 100 ppm) were added to a Fisher-Porter vessel equipped with a stir bar and pressure head. The vessel was sealed with the pressure head, removed from the glovebox, and then attached to an ethylene source (99.995% pure). The vessel was purged with ethylene at 40° C. Then, the vessel was pressurized to 150 psig with ethylene and the reaction was allowed to proceed at 40° C. for 4 hours. Next, the reaction was cooled to room temperature and the ethylene was completely vented. 1 mL aliquot of the reaction mixture was removed, quenched with 0.1 mL 1M THMP/IPA solution, heated to 70° C. for 1 hour, and then partitioned between hexane and water (1:2 v/v; 3 mL). The organic phase was analyzed by GC. The experiment was repeated with C710 at 1000 ppm (192 µL; 0.035 M) and with C710 at 10000 ppm (0.048 g; 0.067 mmol) catalyst loading. The results are shown in Table (5).

TABLE (5)

GC retention times and response factors relative to internal standard dodecane (2)

| Catalyst loading (ppm) | (1) (%) | (2) (%) | (3) (%) | (5) (%) | (4) (%) | Ethenolysis Yield (%) | Self-Metathesis Yield (%) |
|---|---|---|---|---|---|---|---|
| 100 | 45.0 | 5.1 | 4.9 | 22.6 | 22.5 | 10.0 | 45.1 |
| 1000 | 43.7 | 6.2 | 6.1 | 22.0 | 22.0 | 12.3 | 44.0 |
| 10000 | 23.2 | 26.8 | 26.2 | 11.7 | 11.8 | 53.0 | 23.5 |

Example 11

Hexenolysis of soybean oil in the presence of C710

Soybean Oil m = 1, n = 4 is linoleate
m = 2, n = 1 is linolenate
a = 1 is palmitate
a = 2 is stearate 1-hexene

1C$_{10}$
(6.7 %)

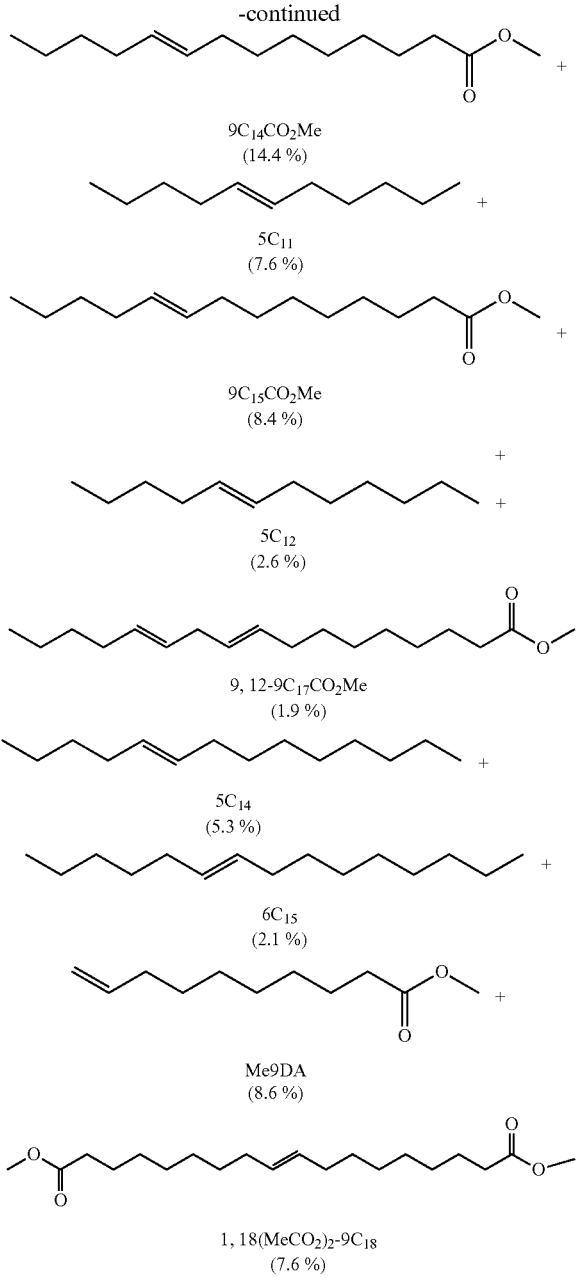

The hexenolysis reaction was carried out using soybean oil which, was purified by thermal (200° C.) treatment and storage over activated alumina followed by filtration. The reaction was set up in a glovebox under an atmosphere of argon. The soybean oil (1.0 g; 1.2 mmol) and the catalyst solution (14.8 µL, 0.0352 M; 100 ppm) were added to a 20 mL septa vial equipped with stir bar. The vial was sealed, removed from the glovebox and then attached via PTFE tube to a bubbler. The reaction was allowed to proceed at 40° C. for 4 hours. The reaction was quenched with 0.2 mL 1M THMP/IPA solution and heated to 60° C. for 1 hour. Next, an aliquot of the reaction crude was trans-esterified with 1 mL of 0.1% sodium methoxide in methanol solution. Then, the reaction mixture was partitioned between water and hexanes (1:1 v/v; 2 mL). The organic phase was analyzed by GC.

Example 12

Ring Closing Metathesis Reaction of Diethyl Diallylmalonate

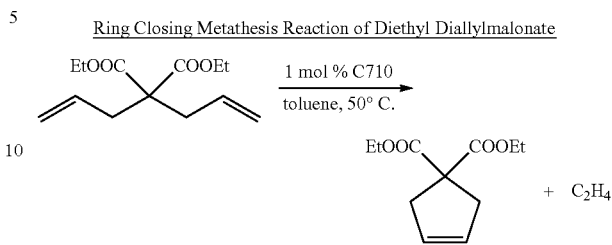

In an argon filled glovebox, a 40 mL scintillation vial containing a stir bar was charged with C710 (7.4 mg, 0.01 mmol), toluene (5 mL) and diethyl diallylmalonate (0.25 g, 1.04 mmol, GC retention time is 7.299 min). The mixture was heated at 50° C. while monitoring the conversion of diethyl diallylmalonate by GC. After 1 h the GC trace indicated complete conversion to the desired cyclopentene product (GC retention time is 6.426 min).

Example 13

Self-metathesis of Methyl Oleate

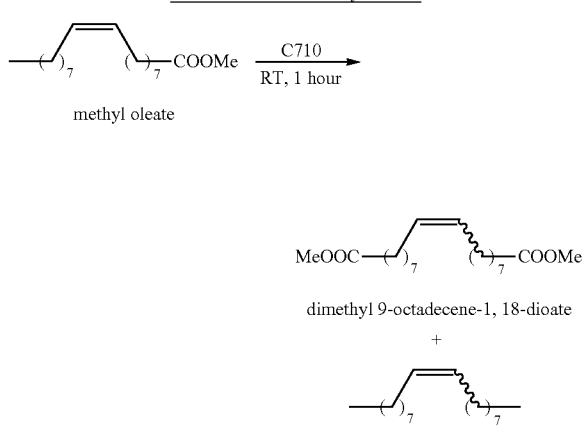

9-octadecene

In an argon filled glovebox, a 4 mL vial containing a stir bar was charged with methyl oleate (0.500 g, 1.69 mmol, GC retention time is 15.268 min) and C710 (61 µL, of a 0.003 M stock solution in DCM, 0.0002 mmol). The reaction mixture was stirred at ambient temperature while monitoring the conversion of methyl oleate by GC. After 1 h the GC trace indicated the reaction had reached complete equilibration with a composition of 25% dimethyl 9-octadecene-1, 18-dioate (GC retention time is 18.283 min), 25% 9-octadecene (GC retention time is 11.782 min) and 50% methyl oleate (GC retention time is 15.270 min).

What is claimed is:

1. An olefin metathesis catalyst represented by Formula (IV):

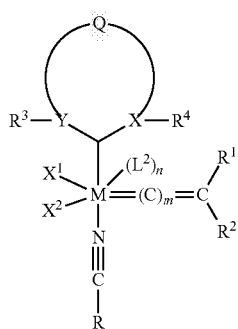

Formula (IV)

wherein

M is a Group 8 transition metal;

$L^2$ is a neutral electron donor ligand;

n is 0 or 1;

m is 0;

R is unsubstituted hydrocarbyl, substituted hydrocarbyl, unsubstituted heteroatom-containing hydrocarbyl, or substituted heteroatom-containing hydrocarbyl;

$X^1$ and $X^2$ are independently anionic ligands;

$R^1$ and $R^2$ are independently hydrogen, unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;

$R^3$ and $R^4$ are independently hydrogen, unsubstituted hydrocarbyl, substituted hydrocarbyl, unsubstituted heteroatom-containing hydrocarbyl, or substituted heteroatom-containing hydrocarbyl;

X and Y are independently C, $CR^{3a}$ or N; and only one of X or Y can be C or $CR^{3a}$;

$R^{3a}$ is hydrogen, unsubstituted hydrocarbyl, substituted hydrocarbyl, unsubstituted heteroatom-containing hydrocarbyl, or substituted heteroatom-containing hydrocarbyl;

Q is a two-atom linkage having the structure $-[CR^{11}R^{12}]_s-[CR^{11}R^{14}]_t-$ or $-[CR^{11}=CR^{13}]-$; $R^{11}$, $R^{12}$, $R^{13}$, and $R^{14}$, are independently hydrogen, unsubstituted hydrocarbyl, substituted hydrocarbyl, unsubstituted heteroatom-containing hydrocarbyl, or substituted heteroatom-containing hydrocarbyl; and "s" and "t" are independently 1 or 2.

2. The olefin metathesis catalyst according to claim 1, wherein:

M is Ru;

n is 0;

m is 0;

$R^1$ is hydrogen;

$R^2$ is unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;

R is unsubstituted hydrocarbyl, substituted hydrocarbyl, unsubstituted heteroatom-containing hydrocarbyl, or substituted heteroatom-containing hydrocarbyl;

$X^1$ and $X^2$ are independently halogen;

Q is a two-atom linkage having the structure $-[CR^{11}R^{12}]_s-[CR^{13}R^{14}]_t-$;

$R^{11}$, $R^{12}$, $R^{13}$, and $R^{14}$, are independently hydrogen;

"s" and "t" are independently 1; and $R^3$ and $R^4$ are independently unsubstituted $C_5$-$C_{24}$ aryl or $C_5$-$C_{24}$ aryl substituted with up to three substituents selected from $C_1$-$C_{20}$ alkyl, substituted $C_1$-$C_{20}$ alkyl, $C_1$-$C_{20}$ heteroalkyl, substituted $C_1$-$C_{20}$ heteroalkyl, $C_5$-$C_{24}$ aryl, substituted $C_5$-$C_{24}$ aryl, $C_5$-$C_{24}$ heteroaryl, substituted $C_5$-$C_{24}$ heteroaryl, $C_6$-$C_{24}$ aralkyl, substituted $C_6$-$C_{24}$ aralkyl, $C_6$-$C_{24}$ alkaryl, substituted $C_6$-$C_{24}$ alkaryl and halide.

3. The olefin metathesis catalyst according to claim 2, represented by Formula (V):

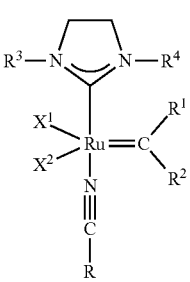

Formula (V)

wherein:

$R^1$ is hydrogen;

$R^2$ is unsubstituted phenyl, substituted phenyl or substituted 1-propenyl; or $R^1$ and $R^2$ are linked together to form an optionally substituted indenylidene;

R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl, or substituted $C_5$-$C_{24}$ aryl;

$X^1$ and $X^2$ are independently Cl, Br, F or I; and $R^3$ and $R^4$ are independently unsubstituted $C_5$-$C_{24}$ aryl or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide.

4. The olefin metathesis catalyst according to claim 3, wherein:

$R^2$ is unsubstituted phenyl, substituted phenyl or substituted 1-propenyl;

R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl, or substituted $C_5$-$C_{24}$ aryl;

$X^1$ and $X^2$ are independently Cl, Br, F or I; and $R^3$ and $R^4$ are independently 2,4,6-trimethylphenyl, 2,6-diisopropylphenyl, 2-iso-propyl-phenyl or 2-isopropyl-6-methyl phenyl.

5. The olefin metathesis catalyst according to claim 4, wherein:

R is methyl;

$R^2$ is phenyl, or 2-methyl-1-propenyl;

$X^1$ and $X^2$ are independently Cl; and $R^3$ and $R^4$ are independently 2,4,6-trimethylphenyl, 2,6-diisopropylphenyl, or 2-isopropyl-6-methyl phenyl.

6. The olefin metathesis catalyst according to claim 4, wherein:

R is methyl;

R¹ and R² are linked together to form 3-phenylinden-1-ylidene;

X¹ and X² are independently Cl; and

R³ and R⁴ are independently 2,4,6-trimethylphenyl, 2,6-diisopropylphenyl, or 2-isopropyl-6-methyl phenyl.

7. The olefin metathesis catalyst according to claim 6, wherein:

R³ and R⁴ are independently 2,4,6-trimethylphenyl.

8. The olefin metathesis catalyst according to claim 3, selected from:

9. The olefin metathesis catalyst according to claim 1, wherein:

M is Ru;

n is 0;

m is 0;

X¹ and X² are independently halogen;

R¹ is hydrogen;

R² is unsubstituted hydrocarbyl, substituted hydrocarbyl, unsubstituted heteroatom-containing hydrocarbyl, or substituted heteroatom-containing hydrocarbyl; or $R^1$ and $R^2$ are linked together to form an optionally substituted indenylidene;

R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl;

Y is N;

X is $CR^{3a}$;

$R^{3a}$ is hydrogen, unsubstituted hydrocarbyl, substituted hydrocarbyl, unsubstituted heteroatom-containing hydrocarbyl, or substituted heteroatom-containing hydrocarbyl; or $R^{3a}$ and $R^4$ can from together a five to ten membered cycloalkyl or heterocyclic ring, with the carbon atom to which they are attached;

Q is a two-atom linkage having the structure —[$CR^{11}R^{12}$]$_s$—[$CR^{13}R^{14}$]$_t$—;

$R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_1$-$C_{12}$ heteroalkyl, substituted $C_1$-$C_{12}$ heteroalkyl, unsubstituted phenyl, or substituted phenyl;

"s" and "t" are independently 1;

$R^3$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide; and $R^4$ is unsubstituted $C_3$-$C_{10}$ cycloalkyl, substituted $C_3$-$C_{10}$ cycloalkyl, unsubstituted $C_5$-$C_{24}$ aryl, or $C_5$-$C_{24}$ aryl substituted with up to three substituents selected from: unsubstituted $C_1$-$C_{20}$ alkyl, substituted $C_1$-$C_{20}$ alkyl, unsubstituted $C_1$-$C_{20}$ heteroalkyl, substituted $C_1$-$C_{20}$ heteroalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ alkaryl, substituted $C_6$-$C_{24}$ alkaryl and halide.

10. The olefin metathesis catalyst according to claim 9, represented by the structure of Formula (VII)

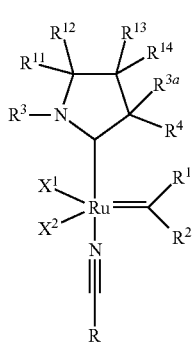

Formula (VII)

wherein:
$R^1$ is hydrogen;
$R^2$ is phenyl, 2-iso-propoxy-phenyl, or 2-methyl-1-propenyl; or $R^1$ and $R^2$ are linked together to form 3-phenylinden-1-ylidene;

R is methyl, ethyl, n-propyl, iso-propyl, n-butyl, tert-butyl, or phenyl;

$X^1$ and $X^2$ are independently Cl;

$R^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl or 2-methyl-phenyl;

$R^{11}$, $R^{12}$, $R^{13}$ and $R^{14}$ are independently hydrogen, unsubstituted $C_1$-$C_{12}$ alkyl, substituted $C_1$-$C_{12}$ alkyl, unsubstituted $C_4$-$C_{12}$ cycloalkyl, substituted $C_4$-$C_{12}$ cycloalkyl, unsubstituted $C_5$-$C_{24}$ aryl, substituted $C_5$-$C_{24}$ aryl, unsubstituted $C_5$-$C_{24}$ heteroaryl, substituted $C_5$-$C_{24}$ heteroaryl, unsubstituted $C_6$-$C_{24}$ aralkyl, substituted $C_6$-$C_{24}$ aralkyl, unsubstituted $C_6$-$C_{24}$ heteroaralkyl or substituted $C_6$-$C_{24}$ heteroaralkyl;

$R^{3a}$ is methyl, ethyl, n-propyl, or phenyl; and $R^4$ is methyl, ethyl, n-propyl, or phenyl; or together with $R^{3a}$ can form a five-, six- or ten-, membered cycloalkyl or heterocyclic ring, with the carbon atom to which they are attached.

11. The olefin metathesis catalyst according to claim 1, wherein:

M is Ru;

n is 0;

m is 0;

R is unsubstituted $C_1$-$C_{10}$ alkyl, substituted $C_1$-$C_{10}$ alkyl, unsubstituted $C_3$-$C_8$ cycloalkyl, substituted $C_3$-$C_8$ cycloalkyl, unsubstituted $C_5$-$C_{24}$ aryl or substituted $C_5$-$C_{24}$ aryl;

X and Y are independently N;

Q is a two-atom linkage having the structure —[$CR^{11}R^{12}$]$_s$—[$CR^{13}R^{14}$]$_t$—;

$R^{11}$, $R^{12}$, $R^{13}$, and $R^{14}$, are independently $C_1$-$C_6$ alkyl, or hydrogen;

"s" and "t" are independently 1;

$R^3$ is unsubstituted hydrocarbyl, substituted hydrocarbyl, unsubstituted heteroatom-containing hydrocarbyl, or substituted heteroatom-containing hydrocarbyl;

$R^4$ is unsubstituted hydrocarbyl, substituted hydrocarbyl, unsubstituted heteroatom-containing hydrocarbyl, or substituted heteroatom-containing hydrocarbyl;

$R^1$ is hydrogen and $R^2$ is unsubstituted phenyl, substituted phenyl or substituted 1-propenyl; or $R^1$ and $R^2$ are linked together to form an optionally substituted indenylidene;

is

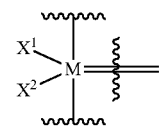

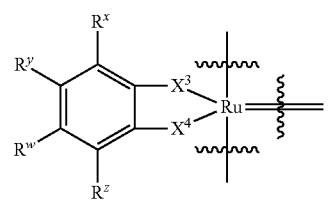

;

$X^3$ and $X^4$ are independently S; and $R^x$, $R^y$, $R^w$ and $R^z$ are independently $C_1$-$C_6$ alkyl, hydrogen, halogen, unsubstituted phenyl or substituted phenyl; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

12. The olefin metathesis catalyst of claim 11, represented by the structure of Formula (VIII)

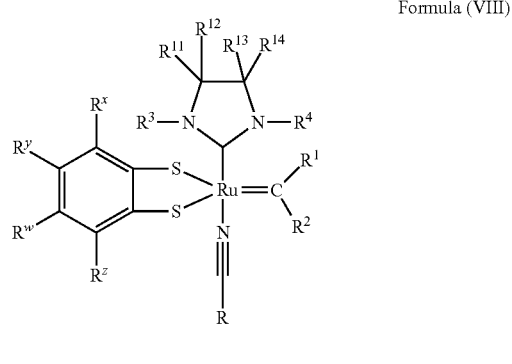

Formula (VIII)

wherein:

$R^1$ is hydrogen and $R^2$ is unsubstituted phenyl, substituted phenyl or substituted 1-propenyl; or $R^1$ and $R^2$ are linked together to form an optionally substituted indenylidene;

R is methyl, ethyl, n-propyl, iso-propyl, n-butyl, tert-butyl, or phenyl;

$R^3$ is adamantyl, 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl or 2-methyl-phenyl;

$R^4$ is 2,4,6-trimethylphenyl, 2,6-di-iso-propylphenyl, 2-methyl-6-tert-butylphenyl, 2-iso-propyl-6-methylphenyl, 2-iso-propyl-phenyl, 2,6-di-ethylphenyl, 2-ethyl-6-methylphenyl, 2,4,6-trifluorophenyl, 3,5-di-tert-butylphenyl, 2,4-dimethylphenyl, 2,6-difluorophenyl or 2-methyl-phenyl;

$R^{11}$, $R^{12}$, $R^{13}$, and $R^{14}$ are independently $C_1$-$C_6$ alkyl, or hydrogen; and $R^x$, $R^y$, $R^w$ and $R^z$ are independently $C_1$-$C_6$ alkyl, hydrogen, halogen, unsubstituted phenyl or substituted phenyl; or $R^x$ and $R^y$ are linked together to form an unsubstituted bicyclic or polycyclic aryl or a substituted bicyclic or polycyclic aryl; or $R^w$ and $R^z$ are linked together to form an unsubstituted bicyclic or polycyclic aryl or a substituted bicyclic or polycyclic aryl; or $R^y$ and $R^w$ are linked together to form an unsubstituted bicyclic or polycyclic aryl or a substituted bicyclic or polycyclic aryl.

13. A method of synthesizing an olefin metathesis catalyst of Formula (B)

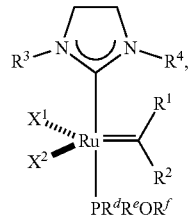

Formula (B)

the method comprising contacting an olefin metathesis catalyst of Formula (V),

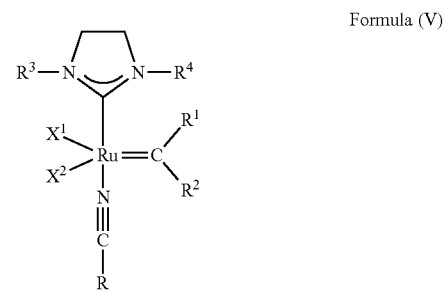

Formula (V)

with a $PR^dR^eOR^f$ ligand at room temperature in an inert solvent, wherein:

R is unsubstituted $C_1$-$C_{10}$ alkyl;

$R^1$ is hydrogen and $R^2$ is phenyl, or 2-methyl-1-propenyl; or $R^1$ and $R^2$ are linked together to form 3-phenylinden-1-ylidene;

$R^3$ and $R^4$ are independently 2,4,6-trimethylphenyl, 2,6-di-iso-propylphenyl, 2-iso-propyl-phenyl or 2-iso-propyl-6-methyl phenyl;

$X^1$ and $X^2$ are independently Cl;

$R^d$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; $R^e$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl; and $R^f$ is unsubstituted $C_1$-$C_{10}$ alkyl, substituted $C_1$-$C_{10}$ alkyl, substituted $C_6$-$C_{10}$ aryl, unsubstituted $C_6$-$C_{10}$ aryl, substituted $C_3$-$C_8$ cycloalkyl or unsubstituted $C_3$-$C_8$ cycloalkyl.

14. The method according to claim 13, wherein:

R is methyl;

$R^3$ and $R^4$ are independently 2,4,6-trimethylphenyl;

$R^d$ is Ph;

$R^e$ is Ph; and $R^f$ is Ph, Me or pOMe-Ph.

15. The method according to claim 14, wherein:

$R^f$ is Ph.

16. A method of synthesizing an olefin metathesis catalyst of Formula (D),

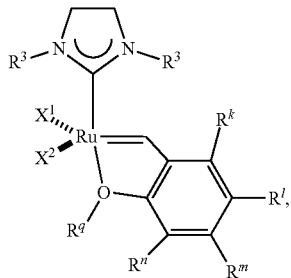

Formula (D)

the method comprising contacting an olefin metathesis catalyst of Formula (V),

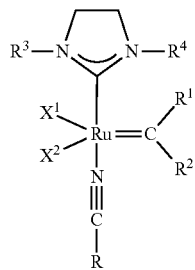

Formula (V)

with a ligand of formula

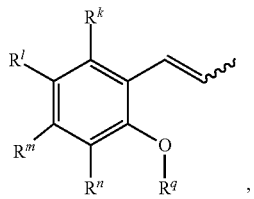

in an inert solvent, wherein:

R is unsubstituted $C_1$-$C_{10}$ alkyl;

$R^1$ is hydrogen and $R^2$ is phenyl, or 2-methyl-1-propenyl; or $R^1$ and $R^2$ are linked together to form 3-phenylinden-1-ylidene;

$R^3$ and $R^4$ are independently 2,4,6-trimethylphenyl, 2,6-diisopropylphenyl, 2-iso-propyl-phenyl or 2-isopropyl-6-methyl phenyl;

$X^1$ and $X^2$ are independently Cl;

$R^k$ is hydrogen, halogen, —$NO_2$, —CN, —$CF_3$, —$SO_2NR^s_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl;

$R^l$ is hydrogen, halogen, —$NO_2$, —CN, —$CF_3$, —$SO_2NR^s_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl;

$R^m$ is hydrogen, halogen, —$NO_2$, —CN, —$CF_3$, —$SO_2NR^s_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl;

$R^n$ is hydrogen, halogen, —$NO_2$, —CN, —$CF_3$, —$SO_2NR^s_2$, —NHC(O)$CF_3$, —NHC(O)$C_6F_5$, —NHC(O)OtBu, unsubstituted hydrocarbyl, substituted hydrocarbyl, unsubstituted heteroatom-containing hydrocarbyl, or substituted heteroatom-containing hydrocarbyl;

$R^s$ is hydrogen or $C_1$-$C_6$ alkyl; and $R^q$ is $C_1$-$C_{10}$ alkyl.

17. The method according to claim 16, wherein:

R is methyl;

$R^3$ and $R^4$ are independently 2,4,6-trimethylphenyl;

$R^k$ is hydrogen;

$R^l$ is hydrogen;

$R^m$ is hydrogen;

$R^n$ is hydrogen; and $R^q$ is iso-propyl.

* * * * *